(12) United States Patent
Otsuka

(10) Patent No.: US 8,241,120 B2
(45) Date of Patent: Aug. 14, 2012

(54) GAME PROGRAM, GAME APPARATUS AND GAME CONTROL METHOD

(75) Inventor: Nagayasu Otsuka, Hyogo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 316 days.

(21) Appl. No.: 12/718,486

(22) Filed: Mar. 5, 2010

(65) Prior Publication Data

US 2010/0160042 A1    Jun. 24, 2010

Related U.S. Application Data

(63) Continuation of application No. PCT/JP2008/065818, filed on Sep. 3, 2008.

(30) Foreign Application Priority Data

Sep. 27, 2007    (JP) ................................. 2007-252052

(51) Int. Cl.
*A63F 13/00* (2006.01)
(52) U.S. Cl. ............................................ 463/31; 463/3
(58) Field of Classification Search ..................... 463/31, 463/32, 33, 2, 3
See application file for complete search history.

(56) References Cited

U.S. PATENT DOCUMENTS

| | | | | |
|---|---|---|---|---|
| 5,745,126 A * | 4/1998 | Jain et al. | ........................ | 382/154 |
| 6,504,539 B1 | 1/2003 | Hiraki | | |
| 7,312,804 B2 * | 12/2007 | Murata | ........................ | 345/632 |
| 2001/0024972 A1 | 9/2001 | Kitao | | |
| 2003/0096648 A1 | 5/2003 | Ohno et al. | | |
| 2003/0107647 A1 * | 6/2003 | James | ........................ | 348/116 |
| 2004/0063501 A1 | 4/2004 | Shimokawa et al. | | |
| 2005/0059488 A1 * | 3/2005 | Larsen et al. | .................... | 463/36 |
| 2005/0266921 A1 | 12/2005 | Hayashida et al. | | |

FOREIGN PATENT DOCUMENTS

| | | | |
|---|---|---|---|
| JP | 2001-070632 | A | 3/2001 |
| JP | 2001-149643 | A | 6/2001 |
| JP | 2001-269482 | A | 10/2001 |
| JP | 2001-353358 | A | 12/2001 |
| JP | 2002-163676 | A | 6/2002 |
| JP | 2003-150980 | A | 5/2003 |
| JP | 2003-334382 | A | 11/2003 |
| JP | 2005-319220 | A | 11/2005 |
| TW | 2005-10040 | A | 3/2005 |

* cited by examiner

*Primary Examiner* — James S McClellan
(74) *Attorney, Agent, or Firm* — Global IP Counselors, LLP

(57) ABSTRACT

It is an object of the present invention to make a game player comfortably watch moving pictures when a camera's line-of-sight tracks a moving object. In a program of the present invention, a control unit recognizes point-of-sight position data for indicating a position of a camera's point-of-sight. Then, the control unit recognizes a view-frustum region and an intra-view-frustum region. Next, the control unit decides whether or not a moving object is located within the intra-view-frustum region. When the control unit decides that the moving object is located outside the intra-view-frustum region, the control unit executes processing of moving at least one of the camera's point-of-sight and a camera's point-of-target so that the moving object is located within the intra-view-frustum region.

8 Claims, 10 Drawing Sheets

GAME PROGRAM, GAME APPARATUS AND GAME CONTROL METHOD

CROSS-REFERENCE TO RELATED APPLICATIONS

This application is a continuation application of International Application No. PCT/JP2008/065818 filed on Sep. 3, 2008, which claims priority of Japanese Patent Application No. 2007-252052 filed on Sep. 27, 2007. The entire disclosure of International Application No. PCT/JP2008/065818 and Japanese Patent Application No. 2007-252052 is hereby incorporated herein by reference.

BACKGROUND OF THE INVENTION

1. Field of the Invention

The present invention relates to a game program, especially to a game program for realizing a game in which a moving object, moving in a three-dimensional game space, is displayed on an image display unit based on a camera coordinate system set down on a position of a camera disposed in the three-dimensional game space. Additionally, the present invention relates to a game apparatus capable of running the game program, and a game control method to be controlled by a computer based on the game program.

2. Background Information

A variety of video games have been conventionally proposed. The video games are configured to be executed by the game apparatus. For example, a general game apparatus includes a monitor, a game console and an input device (e.g., a game pad). The game console is separately provided from the monitor. The input device is separately provided from the game console. Also, plural input buttons are disposed in the game pad.

For example, a baseball game is known as one of the video games realized by the game apparatus of the above type. PROYAKYU SPIRITS 4, Konami Digital Entertainment, PS3 version, Apr. 1, 2007 discloses such video game, as an example.

In a match-up of a pitcher character and a right-handed batter in the baseball game, for instance, the pitcher character is displayed on the center part of a monitor whereas the right-handed batter is displayed on the left part of the monitor. In the situation, a home plate is displayed on the center bottom part of the monitor whereas bleacher seats are displayed on the top part of the monitor. In the displayed condition, the pitcher character starts a series of pitching motion. When the pitcher character releases a ball, the released ball is displayed on the monitor. When the batter character hits back the released ball, the hit-back ball is displayed on the monitor.

As described above, the camera is disposed in the three-dimensional space, and line-of-sight of the camera is focused on a pitcher character's position until the batter character hits back the released ball after the pitcher character starts a series of pitching motion. When the batter character hits back the released ball, the camera's line-of-sight is configured to move in conjunction with movement of the hit-back ball (i.e., moving ball). A series of images, from the start of the pitcher character's pitching motion to the post-hit state of the pitched ball hit back by the batter character, can be displayed on the monitor by controlling the camera's line-of-sight.

The conventional baseball games have configurations that the camera's line-of-sight is focused on the pitcher character's position and/or tracks movement of the ball depending on the match-up condition. When the ball is hit back by the batter character, flies into the outfield seats, and bounces there, the camera's line-of-sight moves in conjunction with every single movement of the ball. Accordingly, there will be a drawback that the moving pictures make a game player feel uncomfortable to watch.

In the conventional baseball games, on the other hand, game providers have set movement of the camera's line-of-sight for every match-up condition as needed. In the aforementioned example, for instance, a game provider has set a command for causing the camera's line-of-sight to be focused on the pitcher character's position and a command for causing the camera's line-of-sight to track movement of the ball as needed.

Processing speed of the game apparatuses has been recently increased. In response, a variety of match-up conditions existing in the real baseball has been realized in the baseball game, too. Accordingly, the number of the match-up conditions is increased much. This produces a drawback that the game providers require a large amount of work for setting movement of the camera's line-of-sight.

To solve the aforementioned drawbacks, an object of the present invention is to provide a game for making a game player comfortably watch moving pictures even if the camera's line-of-sight tracks a moving object. Additionally, another object of the present invention is to provide a game that movement of the camera's line-of-sight can be easily set.

SUMMARY OF THE INVENTION

The foregoing objects can basically be attained by providing a computer readable medium storing a computer program for a video game, a game apparatus for the video game, and a method for controlling the video game.

The computer readable medium stores the computer program for a video game in which a camera coordinate system is set for a position of a camera disposed in a three-dimensional game space and in which a moving object moving in the three-dimensional game space is displayed on an image display unit. The computer program includes code for causing a control unit to recognize point-of-sight position data indicating where a point-of-sight of the camera is, code for causing the control unit to recognize point-of-target position data indicating where a point-of-target of the camera is, code for causing the control unit to recognize a view-frustum region which extends in a direction from the point-of-sight indicated to the point-of-target, code for causing the control unit to recognize an intra-view-frustum region which is within the view-frustum region, code for causing the control unit to determine whether or not the moving object is located within the intra-view-frustum region, and code for causing the control unit to move at least one of the point-of-sight and the point-of-target in order for the moving object to be located within the intra-view-frustum region, if the control unit determines that the moving object is not located in the intra-view-frustum region.

The game apparatus for a video game includes a camera coordinate system which is set for a position of a camera disposed in a three-dimensional game space and in which a moving object moving in the three-dimensional game space is displayed on an image display unit. The game apparatus includes point-of-sight position recognition means for recognizing point-of-sight position data indicating where a point-of-sight of the camera is, point-of-target position recognition means for recognizing point-of-target position data indicating where a point-of-target of the camera is, view-frustum region recognition means for recognizing a view-frustum region which extends in the direction from the point-of-sight to the point-of-target, intra-view-frustum region recognition means for causing recognizing an intra-view-frustum region which is within the view-frustum region, position determination means for determining whether or not the moving object is located within the intra-view-frustum region; and first point-of-sight control means for moving at least one of the point-of-sight and the point-of-target in order for the moving object to be located within the intra-view-frustum region, if that the control unit determines that the moving object is located outside the intra-view-frustum region.

The method for controlling a video game includes a camera coordinate system which is set for a position of a camera disposed in a three-dimensional game space and in which a moving object moving in the three-dimensional game space is displayed on an image display unit. The method includes causing a control unit to recognize point-of-sight position data indicating where a point-of-sight of the camera is, causing the control unit to recognize point-of-target position data indicating where a point-of-target of the camera is, causing the control unit to recognize a view-frustum region which extends in a direction from the point-of-sight indicated to the point-of-target, causing the control unit to recognize an intra-view-frustum region which is within the view-frustum region, causing the control unit to determine whether or not the moving object is located within the intra-view-frustum region, and causing the control unit to move at least one of the point-of-sight and the point-of-target in order for the moving object to be located within the intra-view-frustum region, if the control unit determines that the moving object is not located in the intra-view-frustum region.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is a diagram for illustrating setting aspects of a camera's point-of-sight, a view-frustum area, an intra-view-frustum area, and the like;

FIG. 4 is a diagram for illustrating detailed setting of the camera's view-frustum area, the intra-view-frustum area, and the like;

DETAILED DESCRIPTION OF THE PREFERRED EMBODIMENTS

[Configuration and Operation of Game Apparatus]

Figure 1:
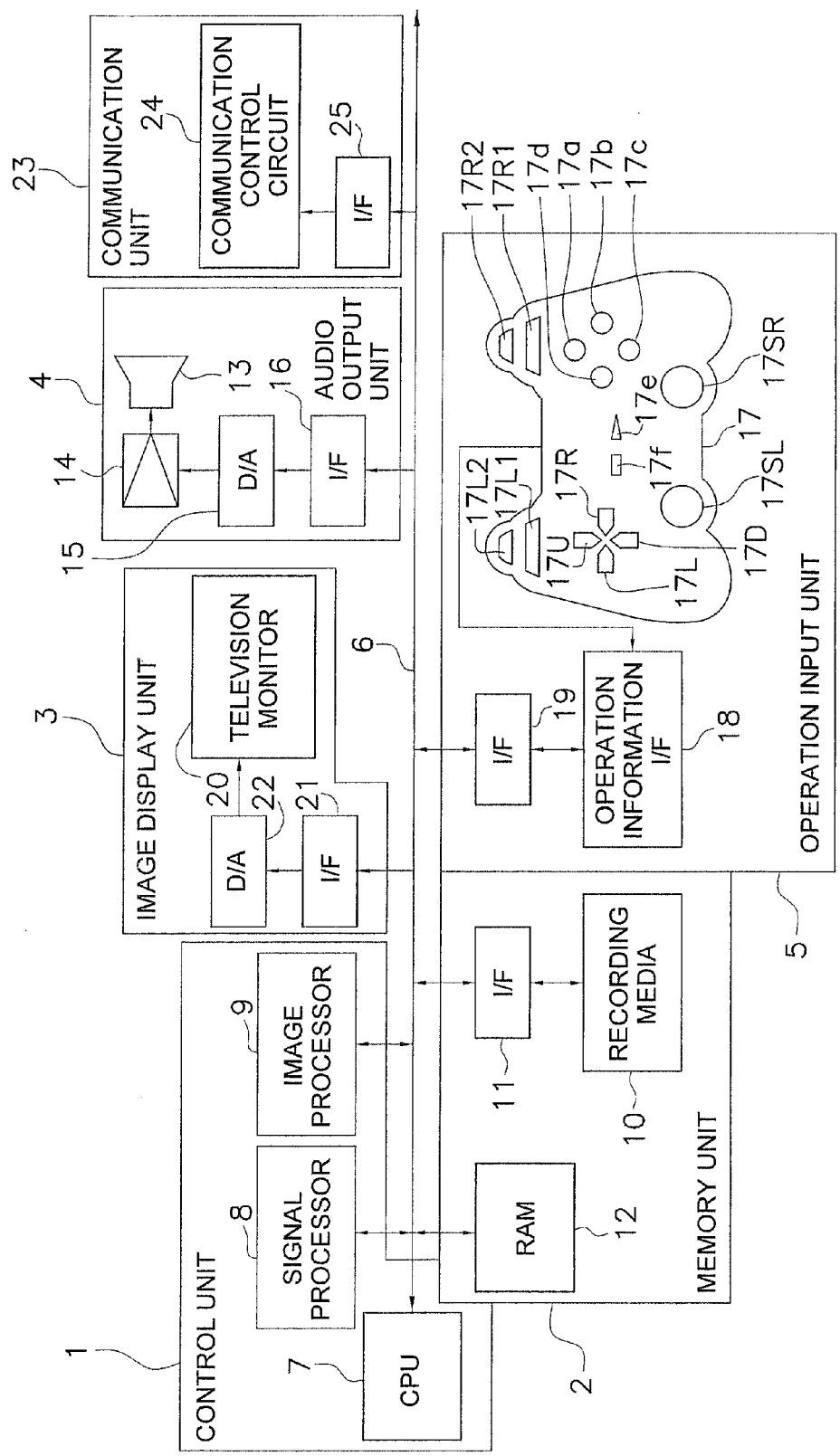
FIG. 1 is a basic configuration diagram of a game apparatus according to an embodiment of the present invention.

FIG. 1 illustrates a basic configuration of a game apparatus according to an embodiment of the present invention. A home video game apparatus will be hereinafter explained as an example of the video game apparatus. The home video apparatus is includes a home video game console and a home television set. A recording medium 10 can be loaded in the home video game console. Game data is read out of the recording medium 10 as needed, and a video game is thereby executed. Contents of thus executed video game are displayed on the home television set.

A game system of the home video game apparatus includes a control unit 1, a memory unit 2, an image display unit 3, an audio output unit 4, an operation input unit 5, and a communication unit 23. These components are connected through a bus 6. The bus 6 includes an address bus, a data bus, a control bus, and the like. In this case, the home video game console of the home video game apparatus includes the control unit 1, the memory unit 2, the audio output unit 4 and the operation input unit 5, whereas the home television set includes the image display unit 3.

The control unit 1 is provided for mainly controlling progress of the entire game based on a game program. The control unit 1 includes, for instance, a CPU (central processing unit) 7, a signal processor 8 and an image processor 9. The CPU 7, the signal processor 8 and the image processor 9 are connected to each other through the bus 6. The CPU 7 interprets a command from the game program and executes a variety of data processing and controls. For example, the CPU 7 commands the signal processor 8 to provide the image processor 9 with image data. The signal processor 8 mainly executes computation in the three-dimensional space, computation for converting a position in the three-dimensional space to a position in the virtual three-dimensional space, light source computation, and generation and processing of the audio data and the video data based on a result of computation executed in the three-dimensional space or the virtual three-dimensional space. The image processor 9 mainly writes the image data to be drawn in a RAM (random access memory) 12 based on the computation result and the processing result of the signal processor 8. Additionally, the CPU 7 commands the signal processor 8 to process a variety of data. The signal processor 8 mainly executes computation corresponding to a variety of data in the three-dimensional space and computation of positional conversion from the three-dimensional space to the virtual three-dimensional space.

The memory unit 2 is provided for mainly storing program data and a variety of data to be used for the program data. The memory unit 2 includes, for instance, the recording medium 10, an interface circuit 11, and the RAM 12. The interface circuit 11 is connected to the recording medium 10. Furthermore, the interface circuit 11 and the RAM 12 are connected through the bus 6. The recording medium 10 is used for recording program data of an operating system and game data including of image data, audio data and a variety of program data. Examples of the recording medium 10 are a ROM (read only memory) which may be available in the form of cassette, an optical disk, and a flexible disk. The program data of the operating system, the game data and the like are stored in the recording medium 10. Another example of the recording medium 10 is a card memory. The card memory is mainly used for storing a variety of game parameters at a time of interruption of the video game. The RAM 12 is used for temporarily storing a variety of data read out of the recording medium 10 and for temporarily storing a processing result from the control unit 1. The RAM 12 temporarily stores the variety of data and address data for indicating storage positions of the variety of data. Accordingly, data can be read/written out of/in the RAM 12 by specifying an arbitral address.

The image display unit 3 is provided for mainly outputting image data written in the RAM 12 and image data to be read out of the recording medium 10 as an image in response to a command of the image processor 9. The image display unit 3 includes, for instance, a television monitor 20, an interface circuit 21 and a D/A converter (digital-to-analog converter) 22. The D/A converter 22 is connected to the television monitor 20. The interface circuit 21 is connected to the D/A converter 22. Furthermore, the bus 6 is connected to the interface circuit 21. In this case, the image data is provided to the D/A converter 22 through the interface circuit 21. In the D/A converter 22, the image data is converted into an analogue image signal. The analogue image signal is outputted to the television monitor 20 as an image.

For example, polygon data and texture data are herein used as the image data. The polygon data is the coordinate data of apexes forming a polygon. On the other hand, the texture data is used for setting a texture with respect to the polygon. The texture data includes the texture specifying data and the texture color data. The texture specifying data is used for associating the polygon and the texture, whereas the texture color data is used for specifying a texture color. Additionally, the polygon data is associated with the polygon address data, whereas the texture data is associated with the texture address data. The polygon address data indicates a memory location of the polygon data, whereas the texture address data indicates a memory location of the texture data. In the aforementioned image data, the signal processor 8 executes the coordinate conversion and the perspective projection conversion with respect to the polygon data in the three-dimensional space (i.e., the three-dimensional polygon data), which is specified by the polygon address data, based on the displacement data and the rotational data of the screen itself (i.e., point-of-sight). Accordingly, the three-dimensional polygon data is converted into the polygon data in the two-dimensional space (i.e., the two-dimensional polygon data). A polygon outline is made with a plurality of two-dimensional polygon data, and the texture data which are specified by the texture address data, is written in the internal area of the polygon. As a result, a variety of objects (i.e., charactres) can be expressed by applying textures to polygons.

The audio output unit 4 is provided for mainly outputting audio data to be read out of the recording medium 10 as audio. The audio output unit 4 includes, for instance, a speaker 13, an amplifier circuit 14, a D/A converter 15 and an interface circuit 16. The amplifier circuit 14 is connected to the speaker 13, and the D/A converter 15 is connected to the amplifier circuit 14. Furthermore, the interface circuit 16 is connected to the D/A converter 15, and the bus 6 is connected to the interface circuit 16. In this case, audio data is provided to the D/A converter 15 through the interface circuit 16. The audio data is converted into an analogue audio signal in the D/A converter 15. The analogue audio signal is amplified by the amplifier circuit 14, and is outputted from the speaker 13 as audio. Examples of the audio data are ADPCM (adaptive differential pulse code modulation) data and PCM (pulse code modulation) data. When the audio data is the ADPCM data, audio can be outputted from the speaker 13 with a similar way to the aforementioned processing method. On the other hand, when the audio data is the PCM data, audio can be outputted from the speaker 13 with a similar way to the aforementioned processing method by preliminarily converting the PCM data into the ADPCM data in the RAM 12.

The operation input unit 5 mainly includes a controller 17, an operation information interface circuit 18 and an interface circuit 19. The operation information interface circuit 18 is connected to the controller 17, and the interface circuit 19 is connected to the operation information interface circuit 18. Furthermore, the bus 6 is connected to the interface circuit 19.

The controller 17 is an operating device to be used by a game player for inputting an operation command. The controller 17 transmits an operation signal to the CPU 7 in response to a game player's operation. The controller 17 is provided with a first button 17a, a second button 17b, a third button 17c, a fourth button 17d, an up key 17U, a down key 17D, a left key 17L, a right key 17R, a L1 button 17L1, a L2 button 17L2, a R1 button 17R1, a R2 button 17R2, a start button 17e, a select button 17f, a left stick 17SL and a right stick 17SR.

The up key 17U, the down key 17D, the left key 17L and the right key 17R are used for giving the CPU 7 a command of causing a character and a cursor to move in up, down, left and right directions on the screen of the television monitor 20, for instance.

The start button 17e is used for instructing the CPU 7 to load the game program from the recording medium 10.

The select button 17f is used for instructing the CPU 7 to execute a variety of user's choices with respect to the game program loaded from the recording medium 10.

The left stick 17SL and the right stick 17SR are stick-type controllers having approximately the same configuration as a so-called joystick. Each of the stick-type controllers includes an upright stick. The upright stick of the right/left stick 17SR/17SL can be slanted about the fulcrum from the upright position to any direction of 360 degrees including front, back, right and left directions. In response to the slanted direction and the angle of the upright stick of the right/left stick 17SR/17SL, the right/left stick 17SR/17SL transmits values of the x and y coordinates as an operation signal to the CPU 7 through the operation information interface circuit 18 and the interface circuit 19. Each of the x and y coordinates herein includes the upright position of the upright stick of the right/left stick 17SR/17SL as the origin.

A variety of functions are allocated to the first button 17a, the second button 17b, the third button 17c, the fourth button 17d, the L1 button 17L1, the L2 button 17L2, the R1 button 17R1 and the R2 button 17R2 in accordance with the game program to be loaded from the recording medium 10.

Excluding the right and left sticks 17SR and 17SL, other buttons and keys of the controller 17 are On/Off switches. Specifically, they are configured to be switched on when pressed from the neutral position by the external pressing force. When the pressing force is released, on the other hand, they return to the neutral positions and are configured to be switched off.

The communication unit 23 includes a communication control circuit 24 and a communication interface 25. The communication control circuit 24 and the communication interface 25 are used for connecting the game console to a server, other game consoles and the like. The communication control circuit 24 and the communication interface 25 are connected to the CPU 7 through a bus 6.

In response to a command from the CPU 7, the communication control circuit 24 and the communication interface 25 control and transmit a connection signal for connecting the game console to the Internet. Furthermore, the communication control circuit 24 and the communication interface 25 control and transmit a connection signal for connecting the game console to a server and other game consoles through the Internet.

The explanation relates to overview of a series of operation to be executed by the home video game apparatus with the aforementioned configuration. When a power switch (not illustrated in the figure) is turned on, the game system is thereby powered on. Then, the CPU 7 reads the image data, the audio data and the program data out of the recording medium 10 based on the operating system stored in the recording medium 10. All or a part of the read out data including the image data, the audio data and the program data, are temporarily stored in the RAM 12. Next, the CPU 7 issues a command for outputting the image and the audio data temporarily stored in the RAM 12 to the television monitor 20 and the speaker 13 as an image and an audio based on the program data temporarily stored in the RAM 12.

For the image data, the signal processor 8 firstly executes the positional computation of a character in the three-dimensional space and the light source computation based on the command from the CPU 7. Next, the image processor 9 executes processing of writing the to-be-drawn image data in the RAM 12 based on the computational result by the signal processor 8. Then, the image data, written in the RAM 12, is provided to the D/A converter 22 via the interface circuit 21. The image data is converted into an analogue image signal in the D/A converter 22. The converted image data is subsequently provided to the television monitor 20, and is displayed thereon as an image.

For the audio data, on the other hand, the signal processor 8 generates and processes the audio data based on the command from the CPU 7. The signal processor 8 herein executes a variety of processing for the audio data including e.g., pitch conversion, noise addition, envelope setting, level setting, and reverb addition. Next, the audio data is outputted from the signal processor 8, and is provided to the D/A converter 15 via the interface circuit 16. The audio data is converted into an analog audio signal in the D/A converter 15. Then, the converted audio data is outputted as the audio from the speaker 13 through the amplifier circuit 14.

[Summary of Various Processing of Game Apparatus]

An example game program to be run by the present game console is a baseball game program. In a baseball game to be executed based on the baseball game program, a camera is disposed in a three-dimensional game space. A camera coordinate system (view coordinate system) is defined on the camera's position. Furthermore, the baseball game is configured to display a scene that a ball (moving object), seen from the camera's point-of-sight, moves in the three-dimensional game space on the television monitor 20.

Figure 2:
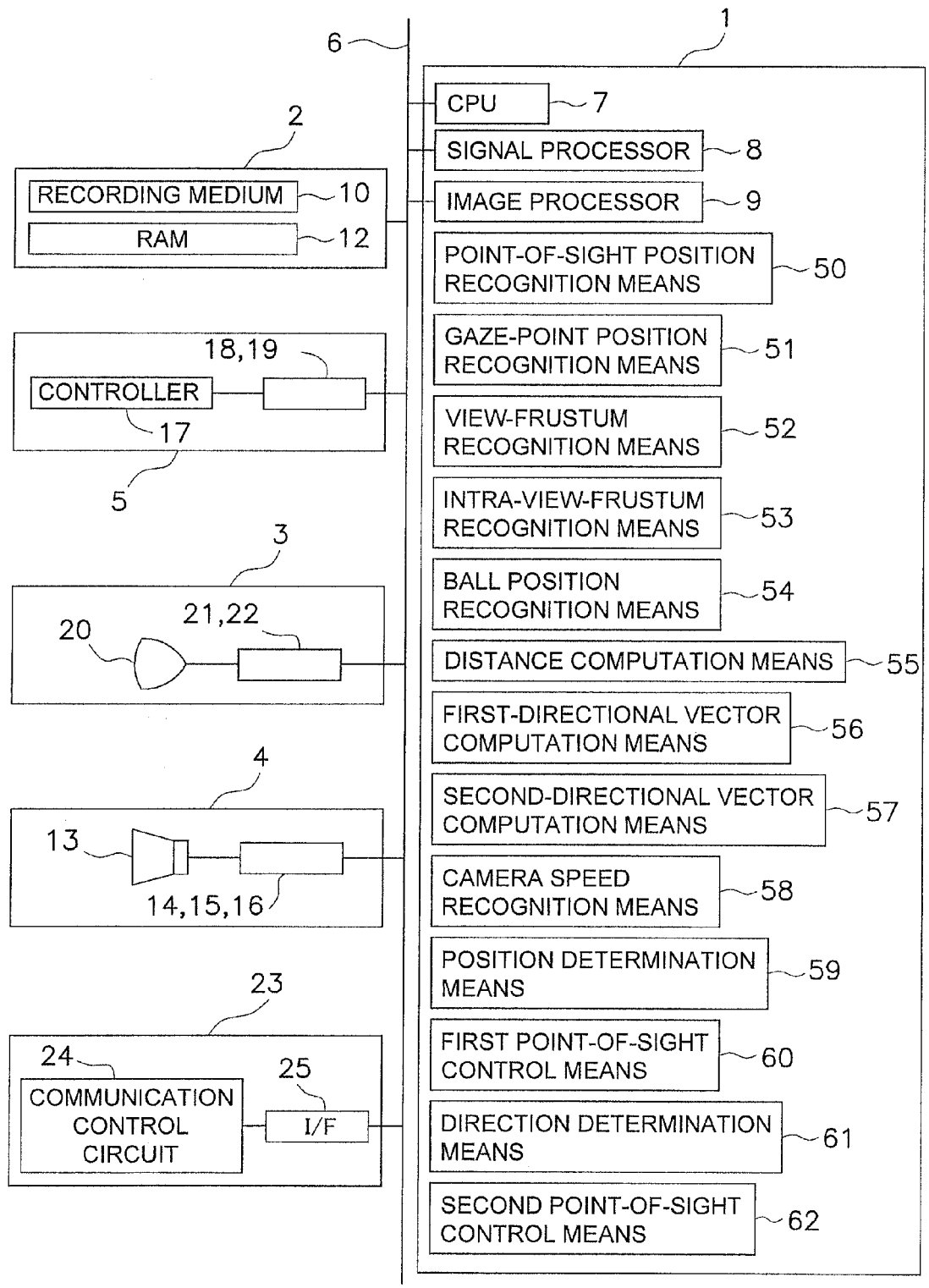
FIG. 2 is a functional block diagram of the game apparatus.

The following explanation relates to a variety of functions playing main roles in the present invention. Now, FIG. 2 is a functional block diagram for illustrating functions playing major roles in the present invention. Note that the term "positional data", which is used in the present embodiment, corresponds to the term "positional coordinate data".

Point-of-sight position recognition means 50 has a function of causing the CPU 7 to recognize point-of-sight position data indicating a position of the camera's point-of-sight. In the point-of-sight position recognition means 50, the point-of-sight position data indicating a position of the camera's point-of-sight is recognized by the CPU 7.

In the means, the point-of-sight position data indicating a position of the camera's point-of-sight is recognized by the CPU 7. For example, the initial position of the camera's point-of-sight is set to be a predetermined position on a scene-by-scene basis. The point-of-sight position data indicating the initial position of the camera's point-of-sight is preliminarily set in the game program. The point-of-sight position data is loaded to the RAM 12 from the recording medium 10 in the load of the game program, and is temporarily stored in the RAM 12. Additionally, when the camera's point-of-sight moves, point-of-sight positional data indicating a post-movement position of the camera's point-of-sight is recognized by the CPU 7.

Point-of-target position recognition means 51 has a function of causing the CPU 7 to recognize point-of-target position data indicating a position of a camera's point-of-target. In the point-of-target position recognition means 51, the point-of-target position data indicating a position of the camera's point-of-target is recognized by the CPU 7.

In the means, the point-of-target position data indicating a position of the camera's point-of-target is recognized by the CPU 7. For example, the initial position of the camera's point-of-target is set to be a predetermined position on a scene-by-scene basis. The point-of-target position data indicating the initial position of the camera's point-of-target is preliminarily set in the game program. The point-of-target position data is loaded to the RAM 12 from the recording medium 10 in the load of the game program, and is temporarily stored in the RAM 12.

View-frustum region recognition means 52 has a function of causing the CPU 7 to recognize a view-frustum region seen from the camera in a direction from the camera's point-of-sight indicated by the point-of-sight position data to the camera's point-of-target indicated by the point-of-target position data. In the view-frustum region recognition means 52, the view-frustum region, seen from the camera in the direction from the camera's point-of-sight indicated by the point-of-sight position data to the camera's point-of-target indicated by the point-of-target position data, is recognized by the CPU 7.

In the means, the region, seen from the camera in the direction from the camera's point-of-sight indicated by the point-of-sight position data to the camera's point-of-target indicated by the point-of-target position data, is recognized by the CPU 7 as a region of the three-dimensional game space to be displayed on the television monitor 20 (the view-frustum region).

In this case, the view-frustum region is defined in the game program as follows. For example, a first plane and a second plane are set in the entire region included in a field of view of the camera to the camera's point-of-target from the camera's point-of-sight (field-of-view region Vk). Specifically, the first plane (near-clip plane) is disposed near the camera, whereas the second plane (far-clip plane) is spaced away from the camera. The first and second planes are also included in the region to be displayed on the television monitor 20. Based on this, a part of the field-of-view region Vk, interposed between the first and second planes, is set as the view-frustum region (see FIG. 3). It is possible to cause the CPU 7 to recognize a position and a range of the view-frustum region in the three-dimensional game space by causing the CPU 7 to recognize position data indicating positions of eight corners of the view-frustum region.

Note that the field-of-view region Vk can be set by defining a position of the camera's point-of-sight, a position of the camera's point-of-target and a camera's view-angle. Specifically, the field-of-view region Vk can be defined based on the point-of-sight position data for indicating the camera's point-of-sight, the point-of-target position data for indicating the camera's point-of-target, and the view-angle data for indicating the camera's view-angle. The herein-used view-angle data for indicating the camera's view-angle is preliminarily set in the game program. The view-angle data is loaded to the RAM 12 from the recording medium 10 in the load of the game program, and is temporarily stored in the RAM 12.

Intra-view-frustum region recognition means 53 has a function of causing the CPU 7 to recognize an intra-view-frustum region set within the view-frustum region for controlling movement of the camera's point-of-sight. In the intra-view-frustum region recognition means 53, the intra-view-frustum region, set within the view-frustum region for controlling at least one of movement of the camera's point-of-sight and that of the camera's point-of-target, is recognized by the CPU 7.

In the means, the intra-view-frustum region, set within the view-frustum region for controlling at least one of the camera's point-of-sight and the camera's point-of-target is recognized by the CPU 7.

In this case, the view-frustum region includes two sub-regions. One is a region where the camera's point-of-sight does not track movement of the ball, whereas the other is a region where the camera's point-of-sight tracks movement of the ball. In this case, the intra-view-frustum region corresponds to the sub-region where the camera's point-of-sight does not track movement of the ball. On the other hand, rest of the view-frustum region excluding the intra-view-frustum region (i.e., an external region of the intra-view-frustum region) corresponds to the region where the camera's point-of-sight tracks movement of the ball. In short, the view-frustum region includes the intra-view-frustum region and rest of the view-frustum region excluding the intra-view-frustum region (i.e., the external region of the intra-view-frustum region). It is possible to cause the CPU 7 to recognize a position and a range of the intra-view-frustum region in the three-dimensional game space by causing the CPU 7 to recognize the positional data for indicating positions of the eight corners of the intra-view-frustum region.

Note that the positional data for indicating positions of the eight corners of the intra-view-frustum region is defined in the relative coordinate that includes the centroid of the view-frustum region as the origin. Additionally, the centroid of the view-frustum region, that is, the origin of the intra-view-frustum region is defined within the intra-view-frustum region. In this case, the position data for indicating positions of the eight corners of the intra-view-frustum region with respect to the centroid of the view-frustum region (i.e., the origin of the intra-view-frustum region) is preliminarily set in the game program. The position data is loaded to the RAM 12 from the recording medium 10 in the load of the game program, and is temporarily stored in the RAM 12.

According to the game program, the control unit 1 recognizes the point-of-sight position data for indicating a position of the point-of-sight of the camera. The control unit 1 recognizes the point-of-target position data for indicating a position of the point-of-target of the camera. The control unit 1 recognizes the view-frustum region defined by the camera in the direction from the camera's point-of-sight indicated by the point-of-sight position data to the camera's point-of-target indicated by the point-of-target position data. The control unit 1 recognizes the intra-view-frustum region set within the view-frustum region for controlling at least one of movement of the camera's point-of-sight and movement of the camera's point-of-target. The control unit 1 determines whether or not the ball (moving object) is located within the intra-view-frustum region. The control unit 1 executes processing of moving at least one of the camera's point-of-sight and the camera's point-of-target for locating the moving object within the intra-view-frustum region, if the control unit determines that the moving object is located outside the intra-view-frustum region.

For example, when a baseball game is executed using the game program, the control unit 1 recognizes the point-of-sight position data for indicating a position of the camera's point-of-sight. Additionally, the control unit 1 recognizes the point-of-target position data for indicating the camera's point-of-target. Then, the control unit 1 recognizes the view-frustum region, which is defined by the camera in a direction from the camera's point-of-sight indicated by the point-of-sight position data to the camera's point-of-target indicated by the point-of-target position data. Next, the control unit 1 recognizes the intra-view-frustum region, which is set within the view-frustum region for controlling at least one of movement of the camera's point-of-sight and that of the camera's point-of-target. Then, the control unit 1 determines whether or not a ball is located within the intra-view-frustum region. When the control unit determines that the ball is located outside the intra-view-frustum region, the control unit executes processing of moving at least one of the camera's point-of-sight and the camera's point-of-target so that the ball can be located within the intra-view-frustum region.

In this case, when the control unit 1 determines that the ball is located outside the intra-view-frustum region, the control unit 1 executes processing of moving at least one of the camera's point-of-sight and the camera's point-of-target so that the ball can be located within the intra-view-frustum region. In other words, at least one of the camera's point-of-sight and the camera's point-of-target moves to track movement of the ball so that the ball can be located within the intra-view-frustum region, if the ball is located outside the intra-view-frustum region.

If the camera's point-of-sight and the camera's point-of-target are configured not to move to track movement of the ball, if the ball is located within the intra-view-frustum region, for instance, the camera's line-of-sight does not necessarily move in conjunction with every single movement of the ball even when the ball, which is hit back by the batter character, bounds in the seats. Therefore, a game player can comfortably watch the moving pictures. Additionally, movement of the camera's line-of-sight can be automatically set by making at least one of the camera's point-of-sight and the camera's point-of-target move to track movement of the ball so that the ball can be located within the intra-view-frustum region. Accordingly, a game provider is not required to set movement of the camera's line-of-sight on a match-up to match-up basis as needed.

An advantageous effect of the first aspect can be summarized as follows. It is possible to prevent a game player from uncomfortably watching moving pictures even if the camera's line-of-sight moves to track movement of the moving object. Additionally, it is possible to easily set movement of the camera's line-of-sight.

Ball-position recognition means 54 has a function of causing the CPU 7 to recognize ball position data indicating a position of the ball. In the ball-position recognition means 54, the ball position data indicating a position of a ball is recognized by the CPU 7.

In the means, the ball position data indicating a position of the ball is recognized by the CPU 7. For example, ball position data indicating a position of the ball in the three-dimensional game space is recognized by the CPU 7.

Distance computation means 55 has a function of causing the CPU 7 to execute processing of computing distance data indicating distance between a position of the camera's point-of-sight and a position of the ball based on the point-of-sight position data and the ball position data. In the distance computation means 55, processing of computing the distance data indicating distance between a position of the camera's point-of-sight and a position of the ball is executed by the CPU 7 based on the point-of-sight position data and the ball position data.

In the means, processing of computing the distance data indicating distance between a position of the camera's point-of-sight and a position of the ball is executed by the CPU 7 based on the point-of-sight position data and the ball position data. In this case, the distance data indicating distance between a position of the camera's point-of-sight and a position of the ball is computed by causing the CPU 7 to execute processing of substituting the point-of-sight position data and the ball position data in a formula for computing distance between two points.

First-directional vector computation means 56 has a function of causing the CPU 7 to execute processing of computing a first-directional vector based on the point-of-sight position data and the point-of-target position data. In this case, the first-directional vector is a vector in a first direction. The first-directional vector includes the camera's point-of-sight (as the initial point) and the camera's point-of-target (as the terminal point). In other words, the first direction is defined as a direction from the camera's point-of-sight to the camera's point-of-target. In the first-directional vector computation means 56, processing of computing the first-directional vector is executed by the CPU 7 based on the point-of-sight position data and the point-of-target position data, while the first-directional vector is in the first direction from the camera's point-of-sight and the camera's point-of-target and includes the camera's point-of-sight (as the initial point) and the camera's point-of-target (as the terminal point).

In the means, processing of computing the first-directional vector is executed by the CPU 7 based on the position data for indicating a position of the camera's point-of-sight (i.e., the point-of-sight position data) and position data for indicating a position of the camera's point-of-target (i.e., the point-of-target position data), while the first-directional vector is in a first direction from the camera's point-of-sight to the camera's point-of-target and includes the camera's point-of-sight (as the initial point) and the camera's point-of-target (as the terminal point). In this case, the first-directional vector is computed by causing the CPU 7 to execute processing of reducing the position data for indicating a position of the camera's point-of-sight (i.e., the point-of-sight position data) from the position data for indicating a position of the camera's point-of-target (i.e., the point-of-target position data).

Second-directional vector computation means 57 has a function of causing the CPU 7 to execute processing of computing a second-directional vector based on the point-of-sight position data and the ball position data. The second-directional vector is a vector in a second direction. The second-directional vector includes the camera's point-of-sight (as the initial point) and the ball (as the terminal point). Accordingly, the second direction is defined as a direction from the camera's point-of-sight to the ball. In the second-directional vector computation means 57, processing of computing the second-directional vector is executed by the CPU 7 based on the point-of-sight position data and the ball position data, while the second-directional vector is in the second direction from the camera's point-of-sight to the ball and includes the camera's point-of-sight (as the initial point) and the ball (as the terminal point).

In the means, processing of computing the second-directional vector is executed by the CPU 7 based on the position data for indicating a position of the camera's point-of-sight (i.e., the point-of-sight position data) and the position data for indicating a position of the ball (i.e., the ball position data), while the second-directional vector is in the second direction from the camera's point-of-sight to the ball and includes the camera's point-of-sight (as the initial point) and the ball (as the terminal point). In this case, the second-directional vector is computed by causing the CPU 7 to execute processing of reducing the position data for indicating a position of the camera's point-of-sight (i.e., the point-of-sight position data) from the position data for indicating a position of the ball (i.e., the ball position data).

Camera-speed recognition means 58 has a function of causing the CPU 7 to recognize camera speed data corresponding to the distance data. The camera speed data indicates at least one of moving speed of the camera's point-of-sight and that of the camera's point-of-target. The camera-speed recognition means 58 has a function of causing the CPU 7 to recognize the camera speed data in which at least one of the moving speed of the camera's point-of-sight and that of the camera's point-of-target is reduced in accordance with distance indicated by the distance data. The camera speed recognition means 58 has functions of: causing the CPU 7 to recognize the camera acceleration data corresponding to the distance data in which at least one of the moving speed of the camera's point-of-sight and that of the camera's point-of-target is reduced in accordance with distance indicated by the distance data; and causing the CPU 7 to recognize the camera speed data computed based on the camera acceleration data.

In the camera speed recognition means 58, the camera-acceleration data corresponding to the distance data, in which at least one of the moving speed of the camera's point-of-sight and that of the camera's point-of-target is reduced in accordance with distance indicated by the distance data, is recognized by the CPU 7. The camera speed data which is computed based on the camera acceleration data is subsequently recognized by the CPU 7.

In the means, the camera acceleration data, in which at least one of the moving speed of the camera's point-of-sight and that of the camera's point-of-target is reduced in accordance with distance indicated by the distance data, is recognized by the CPU 7. For example, the camera-acceleration data, in which at least one of the moving speed of the camera's point-of-sight and that of the camera's point-of-target is reduced when distance is increased between a position of the camera's point-of-sight and a position of the ball, is recognized by the CPU 7. Next, the camera speed data is computed by causing the CPU 7 to execute processing of integrating the camera acceleration data, for instance. The camera speed data is then recognized by the CPU 7.

According to the game program, the control unit 1 recognizes the moving-object position data for indicating a position of the moving object. The control unit 1 executes processing of computing the distance data for indicating distance between a position of the camera's point-of-sight and a position of the moving object based on the point-of-sight position data and the moving-object position data. The control unit 1 recognizes the camera speed data, which corresponds to the distance data and indicates at least one of moving speed of the camera's point-of-sight and moving speed of the camera's point-of-target. Furthermore, the control unit 1 executes processing of moving at least one of the camera's point-of-sight and the camera's point-of-target for locating the moving object within the intra-view-frustum region based on the camera speed data, if the control unit determines that the moving object is located outside the intra-view-frustum region.

For example, when a baseball game is executed using the present game program, the control unit 1 recognizes the ball position data for indicating a position of a ball. Then, the control unit 1 executes processing of computing distance data for indicating distance between a position of the camera's point-of-sight and a position of the ball based on the point-of-sight position data and the ball position data. Next, the control unit 1 recognizes the camera speed data, which corresponds to the distance data and indicates at least one of moving speed of the camera's point-of-sight and that of the camera's point-of-target. When the control unit 1 determines that the ball is located outside the intra-view-frustum region, the control unit 1 executes processing of moving at least one of the camera's point-of-sight and the camera's point-of-target based on the camera speed data so that the ball can be located within the intra-view-frustum region.

In this case, when the control unit determines that the ball is located outside the intra-view-frustum region, the control unit 1 executes processing of moving at least one of the camera's point-of-sight and the camera's point-of-target based on the camera speed data corresponding to the distance data for indicating distance between a position of the camera's point-of-sight and that of the ball, so that the ball can be located within the intra-view-frustum region.

With the configuration, if the ball is located outside the intra-view-frustum region, the camera's point-of-sight and the camera's point-of-target can be quickly moved if distance between the camera's point-of-sight and the ball is short where they can be slowly moved if the distance is long. On the other hand, if the ball is located outside the intra-view-frustum region, the camera's point-of-sight and the camera's point-of-target can be slowly moved if distance between the camera's point-of-sight and the ball is short whereas they can be quickly moved if the distance is long.

Thus, even if at least one of movement of the camera's point-of-sight and that of the camera's point-of-target moves to track movement of the ball in accordance with a situation of a match-up game, it is possible to display movement of the ball on the image display unit without giving a game player a feeling that something is wrong by changing at least one of moving speed of the camera's point-of-sight and that of the camera's point-of-target in accordance with distance between the camera's point-of-sight and the ball. When the aforementioned content is generally described, an advantageous effect of the second aspect can be summarized as follows. It is possible to display movement of the moving object on the image display unit without giving a game player a feeling that something is wrong, even if the camera's line-of-sight moves to track movement of the moving object.

According to the game program, the control unit 1 recognizes the camera speed data in which at least one of the moving speed of the camera's point-of-sight and the moving speed of the camera's point-of-target is reduced in accordance with distance indicated by the distance data.

For example, when a baseball game is executed using the present game program, the control unit 1 recognizes the camera speed data in which at least one of moving speed of the camera's point-of-sight and that of the camera's point-of-target is reduced in response to distance indicated by the distance data.

In this case, when the ball is located outside the intra-view-frustum region, the camera's point-of-sight and the camera's point-of-target can be quickly moved if distance between the camera's point-of-sight and the ball is short, whereas they can be slowly moved if the distance is long. Thus, it is possible to properly display a moving state of the ball, which is configured to be changed depending on depth (distance) from the camera's point-of-view to the ball, on the image display unit by controlling at least wither of movement of the camera's point-of-sight and that of the camera's point-of-target. When the aforementioned content is generally described, an advantageous effect can be summarized as follows. It is possible to display movement of the moving object on the image display unit without giving a game player a feeling that something is wrong by regulating at least one of moving speed of the camera's point-of-sight and that of the camera's point-of-target as described above, even if the camera's line-of-sight moves to track movement of the moving object.

According to the game program, the control unit 1 recognizes camera acceleration data corresponding to the distance data. In the camera acceleration data, at least one of the moving speed of the camera's point-of-sight and the moving speed of the camera's point-of-target is reduced in accordance with distance indicated by the distance data. Furthermore, the control unit 1 recognizes the camera speed data computed based on the camera acceleration data.

In this case, based on the acceleration of the camera's point-of-sight, it is possible to regulate an extent that the moving speed of the camera's point-of-sight is reduced when at least one of moving speed of the camera's point-of-sight and that of the camera's point-of-target is reduced in accordance with distance between the camera's point-of-sight and the ball. Therefore, it is possible to properly display a moving state of the ball, which is configured to be changed depending on depth (distance) from the camera's point-of-sight to the ball, on the image display unit by regulating at least one of moving speed of the camera's point-of-sight and that of the camera's point-of-target. When the aforementioned content is generally described, an advantageous effect of the fourth aspect can be summarized as follows. It is possible to display movement of the moving object without giving a game player a feeling that something is wrong by regulating at least one of moving speed of the camera's point-of-sight and that of the camera's point-of-target based on the acceleration as described above, even if the camera's line-of-sight moves to track movement of the moving object.

Position determination means 59 has a function of causing the CPU 7 to determine whether or not the ball is positioned within the intra-view-frustum region. In the position determination means 59, it is determined by the CPU 7 whether or not the ball is positioned within the intra-view-frustum region.

In the means, it is determined by the CPU 7 whether or not the ball is positioned within the intra-view-frustum region. For example, it is determined by the CPU 7 whether or not the ball is positioned within the intra-view-frustum region to be defined by the position data for indicating positions of eight corners. Specifically, it is determined by the CPU 7 whether or not the position data for indicating a position of the ball is included within a range indicated by the position data for indicating positions of the eight corners.

First point-of-sight control means 60 has a function of causing the CPU 7 to execute processing of moving at least one of the camera's point-of-sight and the camera's point-of-target so that the ball can be positioned within the intra-view-frustum region when the CPU 7 determines that the ball is positioned outside the intra-view-frustum region. The first point-of-sight control means 60 has a function of causing the CPU 7 to execute processing of moving at least one of the camera's point-of-sight and the camera's point-of-target so that the ball can be positioned within the intra-view-frustum region based on the camera speed data when the CPU 7 determines that the ball is positioned outside the intra-view-frustum region.

In the first point-of-sight control means 60, processing of moving at least one of the camera's point-of-sight and the camera's point-of-target is executed by the CPU 7 based on the camera speed data so that the ball can be positioned within the intra-view-frustum region when the CPU 7 determines that the ball is positioned outside the intra-view-frustum region.

In the means, processing of moving at least one of the camera's point-of-sight and the camera's point-of-target toward a position of the ball is executed by the CPU 7 based on the camera speed data when the CPU 7 determines that the ball is positioned outside the intra-view-frustum region. For example, processing of moving at least one of the camera's point-of-sight and the camera's point-of-target toward a position of the ball is executed by the CPU 7 based on the camera speed data when the CPU 7 determines that the ball is positioned outside the intra-view-frustum region. Specifically, processing of moving camera's line-of-sight toward a position of the ball by moving at least one of the camera's point-of-sight and the camera's point-of-target is executed by the CPU 7 based on the camera speed data when the CPU 7 determines that the ball is positioned outside the intra-view-frustum region.

Direction determination means 61 has a function of causing the CPU 7 to determine whether or not the first direction and the second direction match based on the first-directional vector and the second-directional vector. In the direction determination means 61, it is determined by the CPU 7 whether or not the first direction and the second direction match based on the first-directional vector and the second-directional vector.

In the means, it is determined by the CPU 7 whether or not the first direction and the second direction match based on the first-directional vector in the first direction from the camera's point-of-sight (as the initial point) to the camera's point-of-target (as the terminal point) and the second-directional vector in the second direction from the camera's point-of-sight (as the initial point) and the ball (as the terminal point). For example, processing of computing inner product of the first-directional vector and the second-directional vector is executed by the CPU 7. It is subsequently determined by the CPU 7 whether or not the inner product is "1". In this case, inner product of the first-directional vector and the second-directional vector is computed whilst each vector is standardized so that magnitude thereof is set to be "1".

Second point-of-sight control means 62 has a function of causing the CPU 7 to execute processing of stopping at least one of movement of the camera's point-of-sight and that of the camera's point-of-target when the CPU 7 determines that the first direction and the second direction match. The second point-of-sight control means 62 has a function of causing the CPU 7 to execute processing of stopping at least one of the movement of the camera's point-of-sight and that of the camera's point-of-target when the CPU 7 determines that the first direction and the second direction match under the condition that the CPU 7 determines that the ball is positioned outside the intra-view-frustum region but oppositely determines that the ball is positioned within the intra-view-frustum region in a later point of time.

In the second point-of-sight control means 62, processing of stopping at least one of movement of the camera's point-of-sight and that of the camera's point-of-target is executed by the CPU 7 when the CPU 7 determines that the first direction and the second direction match under the condition that the CPU 7 determines that the ball is positioned outside the intra-view-frustum region but oppositely determines that the ball is positioned within the intra-view-frustum region in a later point of time.

In the means, the following processing is executed by the CPU 7 when the CPU 7 determines that the ball is positioned outside the intra-view-frustum region but oppositely determines that the ball is positioned within the intra-view-frustum region in a later point of time. For example, processing of stopping at least one of movement of the camera's point-of-sight and that of the camera's point-of-target is executed by the CPU 7 when the CPU 7 determines that the first direction and the second direction match under the condition that the ball returns to the inside of the intra-view-frustum region from the outside thereof. Specifically, when the CPU 7 determines that the first direction and the second direction match under the condition that the ball returns to the inside of the intra-view-frustum region from the outside thereof, the CPU 7 issues a command for stopping at least one of movement of the camera's point-of-sight and that of the camera's point-of-target, that is, a command for stopping the processing of moving the camera's line-of-sight toward a position of the ball by moving at least one of the camera's point-of-sight and the camera's point-of-target. With the configuration, processing of moving at least one of the camera's point-of-sight and the camera's point-of-target toward a position of the ball is stopped by the CPU 7.

According to the game program, the control unit 1 recognizes moving-object position data for indicating a position of the moving object. The control unit 1 executes processing of computing the first-directional vector based on the point-of-sight position data and the point-of-target position data. The first-directional vector is in the first direction from the camera's point-of-sight as an initial point to the camera's point-of-target as a terminal point. The control unit 1 executes processing of computing a second-directional vector based on the point-of-sight position data and the moving-object position data. The second-directional vector is in the second direction from the camera's point-of-sight as an initial point to the moving object as a terminal point. The control unit determines whether or not the first direction and the second direction match based on the first-directional vector and the second-directional vector. The control unit 1 executes processing of stopping at least one of movement of the camera's point-of-sight and movement of the camera's point-of-target when the control unit determines that the first direction and the second direction match.

For example, when a baseball game is executed using the present game program, the control unit 1 recognizes moving-object position data for indicating a position of a ball. Then, based on the point-of-sight position data and the point-of-target position data, the control unit 1 executes processing of computing a first-directional vector in the first direction from the camera's point-of-sight as the initial point and the camera's point-of-target as the terminal point. Additionally, based on the point-of-sight position data and the moving-object position data, the control unit 1 executes processing of computing a second-directional vector in a second direction from the camera's point-of-sight as the initial point and the moving object as the terminal point. Then, the control unit 1 determines whether or not the first direction and the second direction match based on the first-directional vector and the second-directional vector. When the control unit determines that the first direction and the second direction match, it executes processing of stopping at least one of movement of the camera's point-of-sight and that of the camera's point-of-target.

In this case, the control unit 1 executes processing of stopping at least one of movement of the camera's point-of-sight and that of the camera's point-of-target, if the control unit 1 determines that the first direction from the camera's point-of-sight as the initial point to the camera's point-of-target as the terminal point matches with the second direction from the camera's point-of-sight as the initial point to the moving object as the terminal point. Specifically, the control unit executes processing of stopping movement of the camera, if a direction of the camera's line-of-sight (i.e., first direction) matches with a direction of the ball seen from the camera's point-of-sight (i.e., second direction), in other words, if the ball is located in a direction of the camera's line-of-sight.

With the configuration, for instance, movement of the camera's point-of-sight is stopped, if the ball, which is hit back by the batter character, is located in a direction of the camera's line-of-sight while moving. Therefore, a game player can comfortably watch moving pictures that show a moving state of the ball hit back by the batter character. Furthermore, movement of the camera's point-of-sight is stopped, if the ball, which is hit back by the batter character, is located in a direction of the camera's line-of-sight. With the configuration, the camera's line-of-sight does not move in conjunction with movement of the ball even if the ball is hit back by the batter character and bounces in the seats. Therefore, a game player can comfortably watch the moving images. When the aforementioned content is generally described, an advantageous effect of the fifth aspect can be summarized as follows. A game player can comfortably watch moving images because movement of the camera is stopped, if the camera shoots the moving object in the direction of the camera's line-of-sight.

According to the game program, the control unit 1 executes processing of moving the camera's point-of-sight for locating the moving object within the intra-view-frustum region, if the control unit determines that the moving object is located outside the intra-view-frustum region. The control unit executes processing of stopping at least one of the movement of the camera's point-of-sight and that of the camera's point-of-target, if the control unit 1 determines that the first direction and the second direction match under a condition that the control unit determines that the moving object is located within the intra-view-frustum region after the control unit 1 determines that the moving object is located outside the intra-view frustum region.

For example, when a baseball game is executed using the present game program, the control unit executes processing of moving the camera's point-of-sight so that the ball can be located within the intra-view-frustum region, if the control unit determines that the ball is located outside the intra-view-frustum region. The control unit 1 executes processing of stopping at least one of movement of the camera's point-of-sight and that of the camera's point-of-target, if the control unit 1 determines that the first direction and the second direction match under a condition that the control unit determines that the ball is located outside the intra-view-frustum region but oppositely determines that the ball is located within the intra-view-frustum region in a later point of time.

In this case, the control unit 1 executes processing of stopping at least one of movement of the camera's point-of-sight and that of the camera's point-of-target, if it determines that the first direction and the second direction match under the condition that it decides that the ball is located outside the intra-view-frustum region and oppositely decides that the ball is located within the intra-view-frustum region in a later point of time.

With the configuration, movement of the camera is stopped, for instance, if the ball is hit back by the batter character, returns to the inside of the intra-view-frustum region from the outside thereof while moving and the ball is located in a direction of the cameras line-of-sight. Therefore, a game player can comfortably watch moving pictures that show a moving state of the ball hit back by the batter character. Furthermore, the camera's line-of-sight does not necessarily move in conjunction with every single movement of the ball even if the ball, which is hit back by the batter character, bounces in the seats. This is also because movement of the camera is stopped, if the ball which is hit back by the batter character returns to the inside of the intra-view-frustum region from the outside thereof and the ball is located in a direction of the camera's line-of-sight. Consequently, a game player can comfortably watch the moving pictures. When the aforementioned content is generally described, an advantageous effect will be summarized as follows. Movement of the camera is stopped, if the moving object returns to the inside of the intra-view-frustum region from the outside thereof and the camera shoots the returned moving object in a direction of the camera's line-of-sight.

[Processing Flow and Explanation of Ball Tracking System in Baseball Game]

Figure 9:
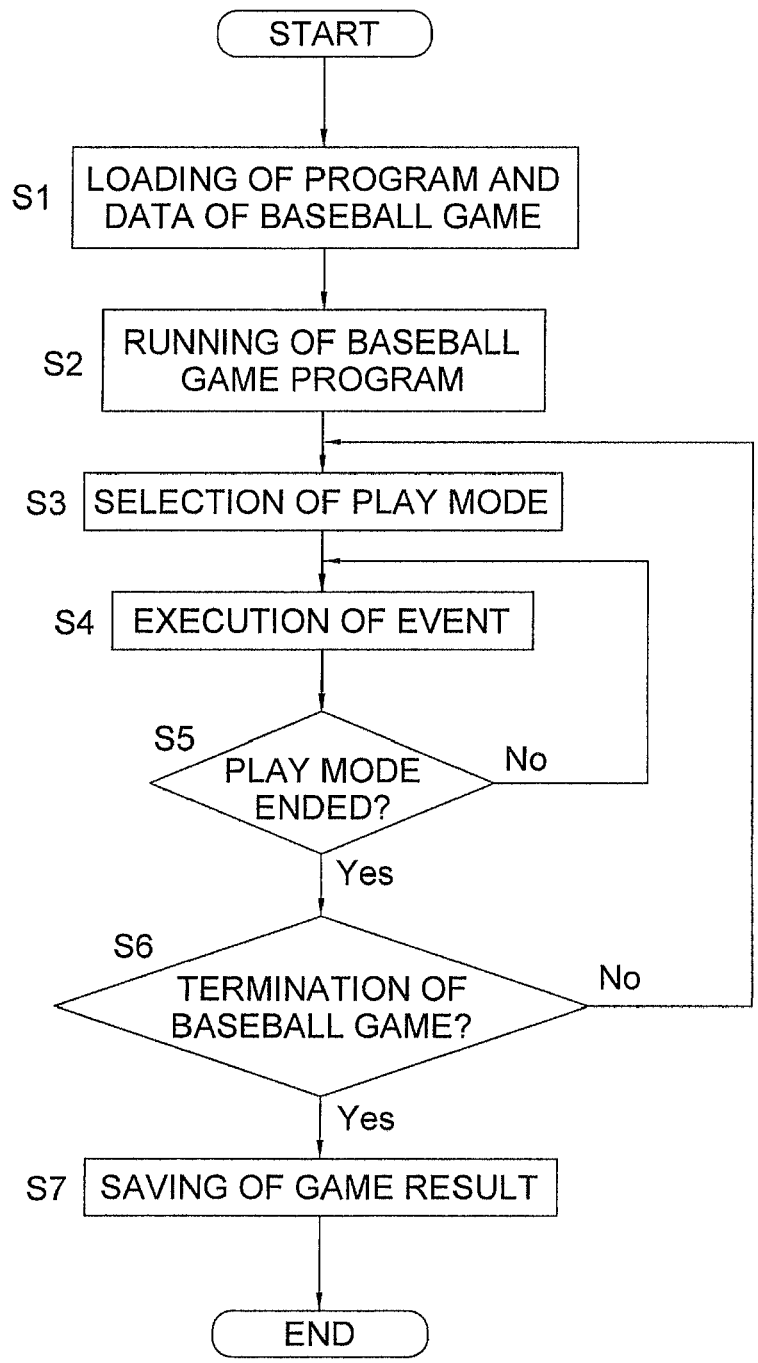
FIG. 9 is a flowchart for illustrating the summary of the entire baseball game.
Figure 10:
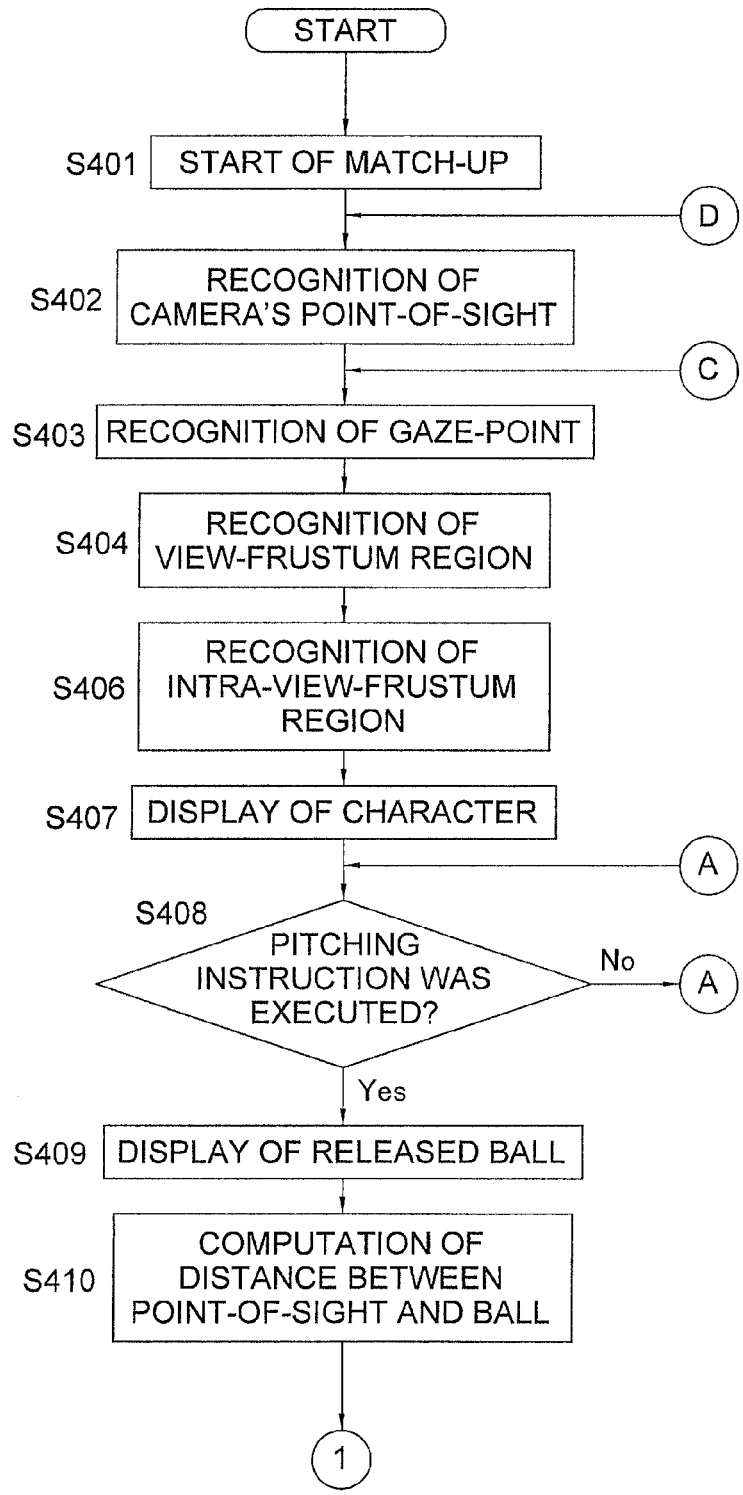
FIG. 10 is a flowchart for illustrating a part of a ball tracking system in the baseball game.
Figure 11:
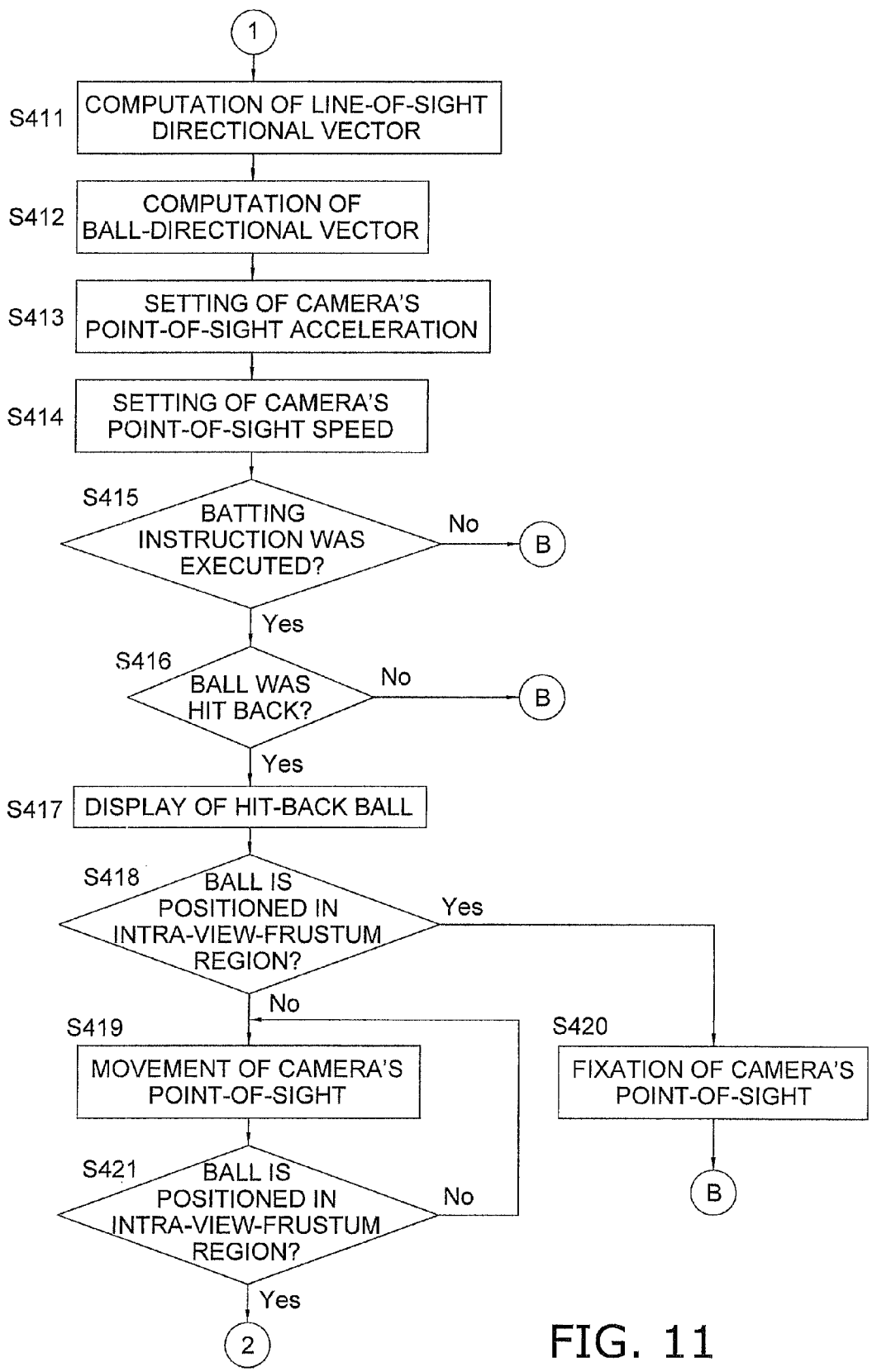
FIG. 11 is a flowchart for illustrating a part of the ball tracking system in the baseball game.
Figure 12:
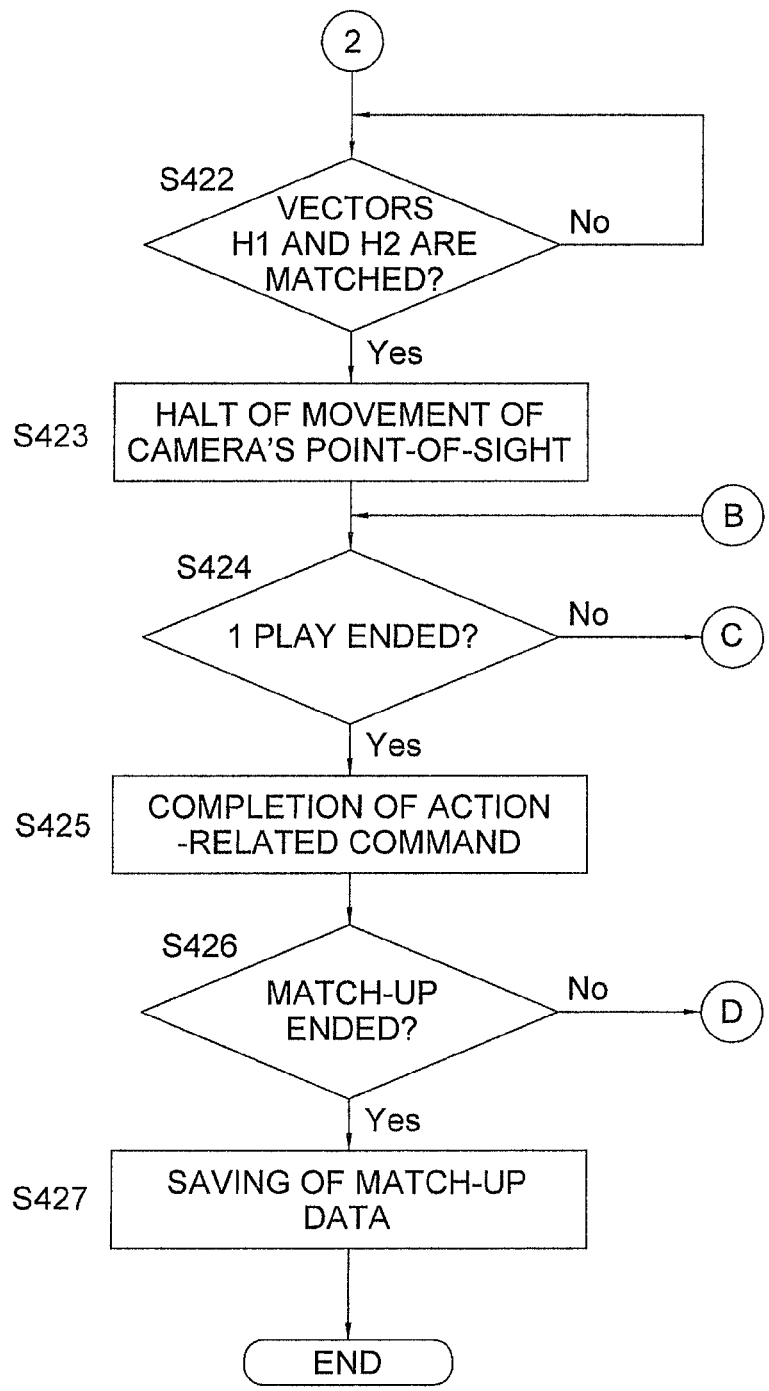
FIG. 12 is a flowchart for illustrating a part of the ball tracking system in the baseball game.

Next, a ball tracking system in the baseball video game will be hereinafter explained. In addition, a series of processing flow illustrated in FIGS. 9, 10, 11 and 12 will be simultaneously hereinafter explained. Note that FIG. 9 is a flowchart for explaining summary of the entire baseball video game, whereas FIGS. 10 to 12 are flowcharts for explaining the ball tracking system.

First, when the switch of the game console is turned on and the game console is activated, the baseball game program is loaded to the RAM 12 from the recording medium 10 and is temporarily stored there. In this case, a variety of basic game data, which is required for executing the baseball video game, is also simultaneously loaded to the RAM 12 from the recording medium 10 and is temporarily stored there (Step S1).

For example, the basic game data includes data of a variety of images to be used in the three-dimensional game space. Next, the data of a variety of images for the three-dimensional game space is recognized by the CPU 7. For example, the data includes image data of stadiums, baseball player characters, and a variety of objects. On the other hand, the basic game data includes position coordinate data. The position coordinate data is herein used for disposing the data of a variety of images for the three-dimensional game space in the three-dimensional game space. Moreover, the basic game data includes the data to be used in the ball tracking system.

Next, the CPU 7 runs the baseball video game program temporarily stored in the RAM 12 based on the basic game data (Step S2). Accordingly, a startup screen of the baseball game is displayed on the television monitor 20. Then, a variety of setting screens is displayed on the television monitor 20 for executing the baseball video game. For example, a mode selection screen (not illustrated in the figure) is herein displayed on the television monitor 20 for selecting a play mode of the baseball video game. A play mode is selected when a game player selects a game mode through the mode selection screen by operating the controller 17 (Step S3). For example, the play modes herein prepared are; a match-up mode; a pennant mode; and a coach mode. In the match-up mode, a game player selects his/her desired one out of 12 baseball teams and enjoys a match-up game. In the pennant mode, a game player selects his/her desired one out of 12 baseball teams and participates in the pennant race. In the coach mode, a game player fosters baseball player characters as a coach in his/her selected baseball team.

Next, a variety of events are executed by the CPU 7 in the play mode selected through the mode selection screen (Step S4). The events herein executed are classified into some event types including e.g., events automatically controlled by the CPU 7 based on an AI program and events manually controlled by a game player based on an input signal from the controller 17. Controls of a baseball player character are also classified into some control types which include e.g., an automatic control for automatically giving a baseball character, a command based on the AI program, a manual control for directly giving a baseball character, and a command based on an input signal from the controller 17. In the baseball game program, event control and command instruction for a baseball player character are configured to be executed in accordance with an instruction from the controller 17 and/or that from the AI program.

Next, the CPU 7 determines whether or not the selected play mode ends (Step S5). Specifically, the CPU 7 determines whether or not a command for indicating end of the play mode is issued. When the CPU 7 determines that the command for indicating end of the play mode is issued (Yes in Step S5), the CPU 7 executes processing of temporarily storing game continuation data in the RAM 12. When the game continuation data is temporarily stored in the RAM 12, a selection screen is displayed on the television monitor 20 for allowing a game player to select whether or not he/she stops playing the baseball game (Step S6). When a game player selects an item showing termination of the baseball game on the selection screen through the operation of the controller 17 (Yes in Step S6), the CPU 7 executes processing of terminating the baseball video game (Step S7). On the other hand, when a game player selects an item showing continuation of the baseball game on the selection screen through the operation of the controller 17 (No in Step S6), the mode selection screen in Step S3 is displayed on the television monitor 20 again.

Note that the CPU 7 executes a variety of events in the play mode selected on the mode selection screen (Step S4) if the CPU 7 determined that the command for indicating end of the play mode is not issued (No in Step S5).

Next, the ball tracking system will be hereinafter explained.

The following example relates to a case that the ball tracking system is executed in the match-up mode. In the case, for instance, the ball tracking system functions when the match-up mode is selected on the mode selection screen and a game event is executed in the match-up mode. Additionally in the case, a match-up game is performed between a game player A (a game player himself/herself) and a game player B (an opponent player) and the game player A instructs a batter character 70 a command.

Figure 3:
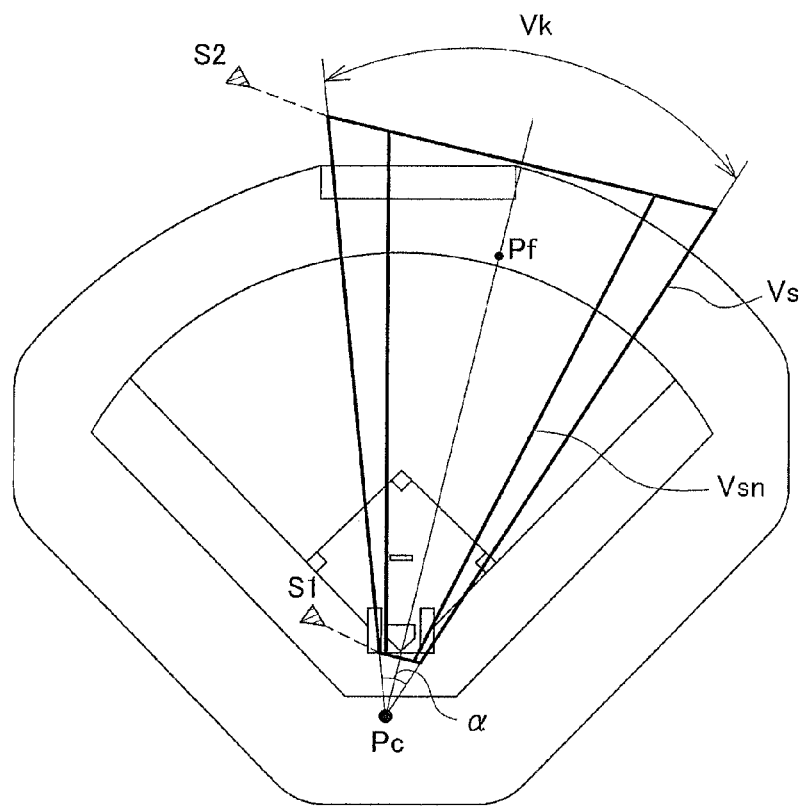

When the game player A/B selects the match-up mode on the mode selection screen, the CPU 7 executes the match-up mode (Step S401). Accordingly, the CPU 7 recognizes the point-of-sight position data for indicating the initial position of the camera's point-of-sight Pc (Step S402). In this case, the camera's point-of-sight Pc is set in a position behind the backstop in the three-dimensional game space, as illustrated in FIG. 3, for instance. The position of the camera's point-of-sight Pc, that is, the point-of-sight position data is preliminarily set in the game program, and the CPU 7 recognizes the point-of-sight position data. Note that the camera's point-of-sight Pc, which is illustrated in FIG. 3, corresponds to one that a batter character is left-handed batter.

Next, the CPU 7 recognizes the point-of-target position data for indicating the initial position of the camera's point-of-target Pf (Step S403). In this case, the camera's point-of-target Pf is set in the seats behind the center outfield, as illustrated in FIG. 3, for instance. More specifically, the camera's point-of-target Pf is set on the right side of a line passing through the home plate and the pitcher character. The position of the camera's point-of-target Pf, that is, the point-of-target position data is preliminarily set in the game program, and the CPU 7 recognizes the point-of-target position data.

Next, the CPU 7 recognizes a region of the three-dimensional game space, which is displayed on the television monitor 20, as the view-frustum region Vs (Step S404). The view-frustum region Vs is seen from the camera's point-of-sight disposed in a position indicated by the point-of-sight position data.

Figure 4:
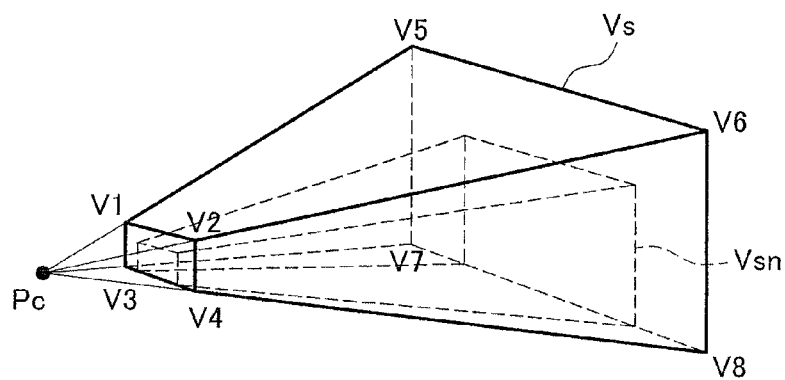

In this case, the view-frustum region is defined as illustrated in FIGS. 3 and 4. For example, a plane S1 (first plane) and a plane S2 (second plane) are set in an entire region (field-of-view region) Vk included in a field-of-view from the camera's point-of-sight Pc. The plane S1 is disposed near the camera's point-of-sight, whereas the plane S2 is spaced away from the camera's point-of-sight. The planes S1 and S2 are both included in the region to be displayed on the television monitor 20. The field-of-view region Vk between the first plane S1 and the second plane S2 is set to be a view-frustum region Vs. It is possible to cause the CPU 7 to recognize a position and a range of the view-frustum region Vs in the three-dimensional game space by causing the CPU 7 to recognize position data indicating positions of eight corners v1 to v8 of the view-frustum region Vs.

Note that the field-of-view region Vk is set by defining a position of the camera's point-of-sight Pc, a position of the camera's point-of-target Pf, and a camera's view-angle $\alpha$, as illustrated in FIG. 3. Specifically, the field-of-view region Vk is defined based on the point-of-sight position data for indicating a position of the camera's point-of-sight Pc, the point-of-target position data for indicating a position of the camera's point-of-target Pf and the view-angle data for indicating the camera's view-angle $\alpha$.

Next, the CPU 7 recognizes an intra-view-frustum region Vsn set within the view-frustum region Vs for controlling movement of the camera's point-of-target Pf (Step S406). In this case, the view-frustum region Vs includes the intra-view-frustum region Vsn in which the camera's point-of-sight Pc does not track movement of the ball and a region in which the camera's point-of-sight Pc tracks movement of the ball (i.e., rest of the view-frustum region Vs excluding the intra-view-frustum region Vsn, in other word, a region outside the intra-view-frustum region Vsn). The intra-view-frustum region Vsn is set within the view-frustum region Vs. The CPU 7 recognizes a position and a range of the intra-view-frustum region Vsn in the three-dimensional game space by causing the CPU 7 to recognize the position data indicating positions of eight corners v'1 to v'8 of the intra-view-frustum region Vsn. For easy viewing, FIG. 4 does not illustrate the eight corners v'1 to v'8 of the intra-view-frustum region Vsn.

Note that the position data for indicating positions of the eight corners v'1 to v'8 of the intra-view-frustum region Vsn is preliminarily set in the game program. The position data for indicating positions of the eight corners of the intra-view-frustum region Vsn is defined based on the relative coordinate including the centroid of the view-frustum region Vs as the origin.

When the view-frustum region Vs and the intra-view-frustum region Vsn are thus set, objects, game characters and the like, positioned within the view-frustum region Vs, are displayed on the television monitor 20 (Step S407).

Figure 5:
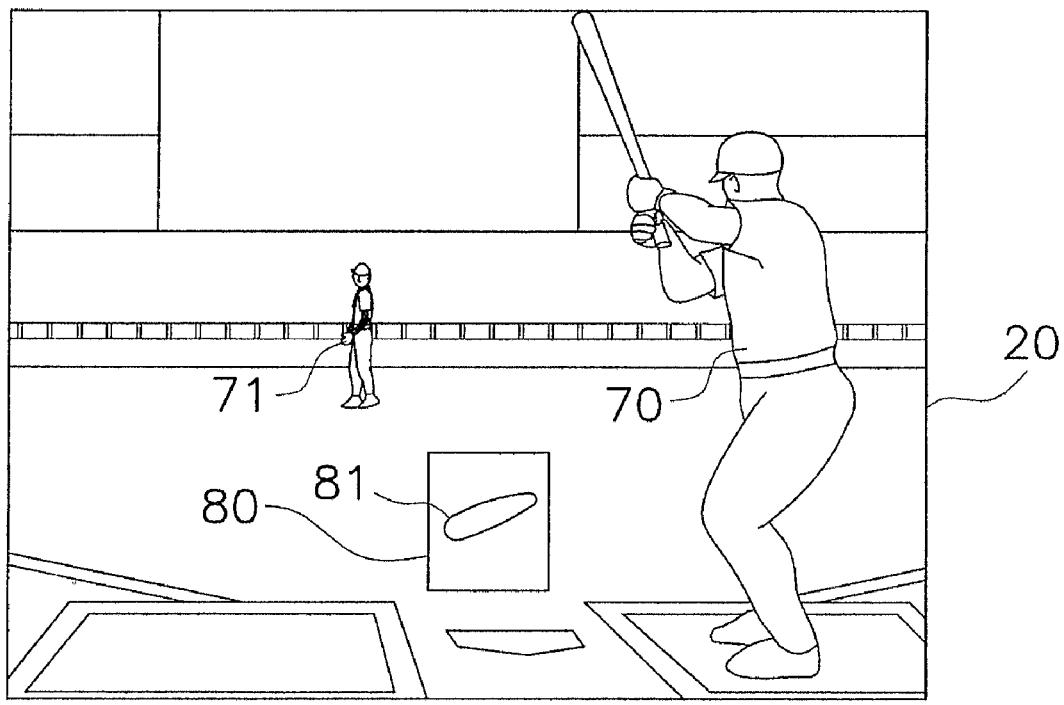
FIG. 5 is a pre-pitching screen to be displayed on a television monitor.

As illustrated in FIG. 5, for instance, the inside of the stadium, a batter character 70 and a pitcher character 71 are displayed using stadium image data, batter-character image data and pitcher-character image data, respectively, on the television monitor 20. Additionally, a ball-hitting zone 81 is displayed with ball-hitting image data on the television monitor 20. The ball-hitting zone 81 herein corresponds to a marking for hitting the ball when the batter character 70 performs a series of swing motions. When a movement command for moving the ball-hitting zone 81 is instructed from the controller 17 of the game player A under the condition, the ball-hitting zone 81 is moved on the television monitor 20 in accordance with the direction instructed through the operation of the controller 17.

Moreover, the CPU 7 executes processing of disposing a plane on which the ball-hitting zone 81 moves (i.e., hitting plane) in a predetermined position of the three-dimensional game space. The hitting plane refers to a plane on which a ball, released by the pitcher character 71, is hit back in the course of swing motions of the batter character 70. Additionally, a strike zone 80 is set on the hitting plane. The strike zone 80 is displayed on the television monitor 20. Note that a position and a range of the hitting plane and those of the strike zone 80 are preliminarily set in the game program.

Next, the CPU 7 determines whether or not an action command for making the pitcher character 71 take actions is instructed to the pitcher character 71 (Step S408). For example, the CPU 7 determines whether or not an action command of pitching of the pitcher character 71 (pitching-related command) is instructed to the pitcher character 71 from the controller 17. When the CPU 7 determines that the pitching-related command is instructed to the pitcher character 71 from the controller 17 (Yes in Step S408), the CPU 7 recognizes the pitching-related command for the pitcher character 71.

In this case, the pitching-related command includes a pitch instruction command for instructing a pitch, a pitching start command for instructing start of pitching, a course instruction command for instructing a pitching course, a release command for instructing release of the ball and the like.

Next, when the CPU 7 recognizes the pitching-related command for the pitcher character 71, a scene that the pitcher character 71 takes actions is displayed on the television monitor 20 using the pitcher image data. For example, when the CPU 7 recognizes the pitch instruction command and subsequently recognizes the pitching start command, a scene that the pitcher character 71 starts and performs a series of pitching motions is displayed on the television monitor 20. Then, when the CPU 7 recognizes the course instruction command and subsequently recognizes the release command, a scene that the pitcher character 71 releases the ball and follows through his pitch is displayed on the television monitor 20.

Next, when the pitcher character 71 releases the ball, the ball pitched by the pitcher character 71 is displayed on the television monitor using the ball image data (Step S409). Additionally, when the pitcher character 71 pitches the ball, a ball-shaped marking (not illustrated in the figure) is disposed on the television monitor 20 using corresponding image data. The marking corresponds to a predicted passage position of the pitched ball on the hitting plane. Thus, the game player A is informed of the predicted ball passage position with the marking.

Furthermore, when the pitcher character 71 pitches a ball B, the CPU 7 recognizes the ball position data for indicating a position of the ball B. For example, the CPU 7 recognizes the ball position data for indicating a position of the ball B in the three-dimensional game space.

Figure 6A:
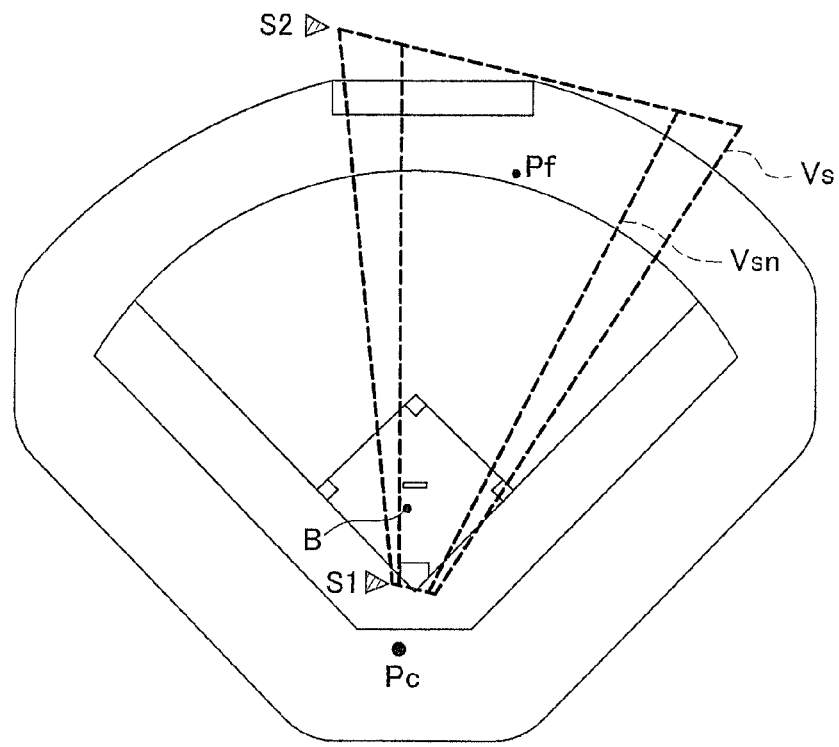
FIG. 6 includes FIGS. 6(a) and 6(b) for illustrating a relation between a ball and a point-of-target.
Figure 6B:
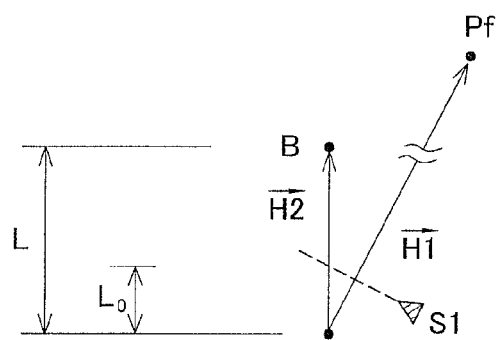

Next, as illustrated in FIG. 6, the CPU 7 executes processing of computing distance data for indicating distance L between a position of the camera's point-of-sight Pc and a position of the ball B based on the point-of-sight position data and the ball position data (Step S410). In this case, the distance data for indicating the distance L between a position of the camera's point-of-sight Pc and a position of the ball B is computed by causing the CPU 7 to execute processing of substituting the point-of-sight position data and the ball position data in a formula for computing distance between two points.

Next, as illustrated in FIG. 6, the CPU 7 executes processing of computing a line-of-sight directional vector H1 (first-directional vector) based on the position data for indicating a position of the camera's point-of-sight Pc (the point-of-sight position data) and the position data for indicating a position of the camera's point-of-target Pf (the point-of-target position data) (Step S411). The line-of-sight directional vector H1 is in a direction from the camera's point-of-sight Pc (as the initial point) to the camera's point-of-target Pf (as the terminal point). In this case, the line-of-sight directional vector H1 is computed by causing the CPU 7 to execute processing of reducing the position data for indicating a position of the camera's point-of-sight Pc (the point-of-sight position data) from the position data for indicating a position of the camera's point-of-target Pf (the point-of-target position data). Note that the line-of-sight directional vector H1 is herein normalized.

Next, the CPU 7 executes processing of computing a ball-directional vector H2 (second-directional vector) based on the position data for indicating a position of the camera's point-of-sight Pc (the point-of-sight position data) and the position for indicating a position of the ball B (the ball position data) (Step S412). The ball-directional vector H2 is in a direction from the camera's point-of-sight Pc (as the initial point) to the ball B (as the terminal point). In this case, the ball-directional vector H2 is computed by causing the CPU 7 to execute processing of reducing the position data for indicating a position of the camera's point-of-sight Pc (the point-of-sight position data) from the position data for indicating a position of the ball B (the ball position data). Note that the ball-directional vector H2 is herein normalized.

Next, the CPU 7 recognizes camera's point-of-sight acceleration data Ac in which moving speed of the camera's point-of-sight Pc is reduced in accordance with the distance L between a position of the camera's point-of-sight Pc and a position of the ball B (Step S413). For example, the CPU 7 recognizes the camera's point-of-sight acceleration data Ac in which moving speed of the camera's point-of-sight Pc is reduced when the distance L is increased between a position of the camera's point-of-sight Pc and a position of the ball B.

Figure 7:
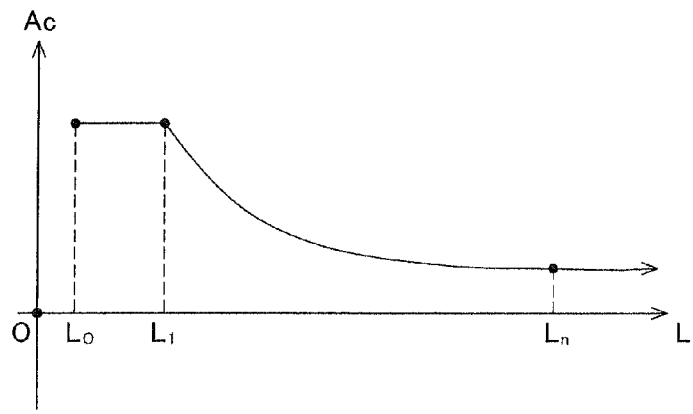
FIG. 7 is a chart for showing a relation between acceleration data for the camera's point-of-sight and distance data between a position of the camera's point-of-sight and that of the ball.

In this case, the distance L and the camera's point-of-sight acceleration data Ac are associated to each other with a function f (Ac=f(L)) as illustrated in FIG. 7. The correspondence is preliminarily set in the game program. Note that "$L_0$" in FIG. 7 indicates distance from the camera's point-of-sight Pc to the first plane S1 (see FIG. 6). Additionally, "L1" in FIG. 7 indicates distance from the camera's point-of-sight Pc to the pitcher character. Furthermore, "Ln" in FIG. 7 indicates distance from the camera's point-of-sight Pc to a fence of the outfield seats nearest therefrom.

Next, camera speed data Bc is computed based on the camera's point-of-sight acceleration data Ac (Step S414). Then, the CPU 7 recognizes the camera speed data Bc. Specifically, the camera's point-of-sight acceleration data Ac can be represented as "Ac=(Bc−Bk)/dt" where the camera's point-of-sight speed data is defined as Bc; the camera's point-of-sight reference speed data is defined as Bk; and a period of time is defined as dt (=$\frac{1}{60}$ seconds). With the configuration, the CPU 7 computes the camera's point-of-sight speed data Bc based on the formula "Bc=Bk+Acdt". Note that the camera's point-of-sight reference speed data Bk is preliminarily set in the game program and is temporarily stored in the RAM 12.

The camera's point-of-sight acceleration data Ac and the camera speed data Bc are herein defined in the point-of-target Pf. In short, as described below, a direction of the camera's line-of-sight varies about the camera's point-of-sight Pc by moving the point-of-target Pf at a speed indicated by the camera speed data Bc. In other words, the view-frustum region Vs and the intra-view-frustum region Vsn move about the camera's point-of-sight Pc in the three-dimensional game space.

In the present embodiment, the case is exemplified that the camera speed data Bc is computed based on the camera's point-of-sight acceleration data Ac as described above. However, it may be possible to directly set the camera speed data Bc in which speed of the camera's point-of-sight Pc is reduced when the distance L is increased between a position of the camera's point-of-sight Pc and a position of the ball B by preliminarily setting a correspondence between the camera speed data Bc and the distance data for indicating the distance L between a position of the camera's point-of-sight Pc and a position of the ball B in the game program.

Next, the CPU 7 determines whether or not it recognizes an action command for making the batter character 70 perform a series of swing motions (batting-related command) (Step S415).

In this case, the batting-related command includes a ball-hitting zone movement command for moving the ball-hitting zone 81, a swing start command for instructing start of a series of swing motions and the like. The CPU 7 herein determines whether or not it recognizes the swing start command whilst the batter character 70, taking a batting position in the batter's box, is being displayed on the television monitor 20. For example, when the ball-hitting zone movement command is instructed, the CPU 7 determines whether or not it recognizes the swing start command after the ball-hitting zone 81 is moved in response to the ball-hitting zone movement command. On the other hand, when the ball-hitting zone movement command is not instructed, the CPU 7 determines whether or not it recognizes the swing start command whilst the ball-hitting zone 81 stands still.

Then, when the CPU 7 recognizes the swing start command (Yes in Step S415), it recognizes whether or not the ball B, released by the pitcher character, is hit back (Step S416). For example, the CPU 7 determines whether or not at least a part of the region of the ball-hitting zone and at least a part of the region of the ball B released by the pitcher character match (i.e., overlap). Then, when the CPU 7 determines that at least a part of the region of the ball-hitting zone and at least a part of the region of the ball B released by the pitcher character match (Yes in S416), the following scene is displayed on the television monitor 20 using the ball image data: the ball B, released by the pitcher character, is hit back by a bat and then the hit-back ball B moves (Step S417).

Next, when the ball B, released by the pitcher character, is hit back by the batter character, the CPU 7 determines whether or not the ball B is positioned within the intra-view-frustum region Vsn (Step S418). For example, the CPU 7 determines whether or not the ball B is positioned within the intra-view-frustum region Vsn that is defined by the position data for indicating positions of eight corners. Specifically, the CPU 7 executes determination whether or not the position data for indicating a position of the ball B is included in a range indicated by the position data for indicating positions of the eight corners of the intra-view-frustum region Vsn.

When the ball B, released by the pitcher character, is not herein hit back by the batter character (No in Step S418), the ball B is configured to be positioned within the intra-view-frustum region Vsn.

Then, when the CPU 7 determines that the ball B is positioned outside the intra-view-frustum region Vsn (No in Step S418), the CPU 7 executes processing of moving the camera's point-of-target Pf toward a position of the ball B based on the camera speed data Bc (Step S419). For example, when the CPU 7 determines that the ball B is positioned within the view-frustum region Vs excluding the intra-view-frustum region Vsn, the CPU 7 executes processing of moving the camera's point-of-target Pf toward a position of the ball B based on the camera speed data Bc. Specifically, when the CPU determines that the position data for indicating a position of the ball B is included outside a range indicated by the position data for indicating positions of the eight corners of the intra-view-frustum region Vsn, the CPU 7 executes processing of moving the camera's point-of-target Pf toward a position of the ball B at a speed indicated by the camera speed data Bc.

With the configuration, the camera's point-of-target Pf rotates about the camera's point-of-sight Pc toward a position of the ball B. Furthermore, the view-frustum region Vs and the intra-view-frustum region Vsn move in conjunction with the rotation of the camera's point-of-target Pf. Accordingly, moving pictures, seen from the camera's point-of-sight disposed in a position indicated by the point-of-sight position data, are displayed on the television monitor 20 as illustrated in FIG. 8.

Figure 8A:
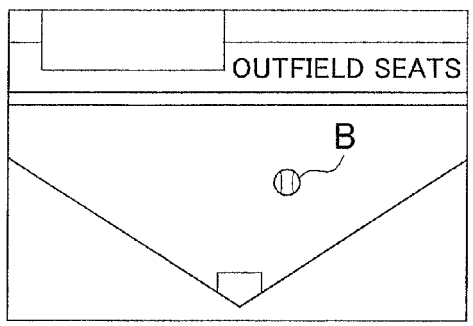
FIG. 8 includes diagrams for illustrating moving pictures to be displayed when the camera's point-of-sight tracks movement of a ball B.
Figure 8B:
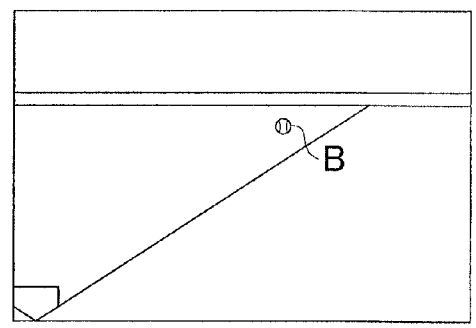

In this case, moving pictures (changes from FIGS. 8(*a*) to 8(*b*)) that the camera's point-of-sight Pc tracks movement of the ball B are displayed on the television monitor 20. For easy viewing, FIG. 8 only illustrates the ball B without illustrating characters and the like.

On the other hand, when the CPU 7 determines that the ball B is positioned within the intra-view-frustum region Vsn (Yes in Step S418), it does not execute processing of moving the camera's point-of-target Pf and thus the camera's point-of-target Pf remains to be fixed (Step S420).

While the CPU 7 is executing processing of moving the camera's point-of-target Pf about the camera's point-of-sight Pc toward a position of the ball, the CPU 7 constantly determins whether or not the position data for indicating a position of the ball is included in a range indicated by the position data for indicating positions of the eight corners of the intra-view-frustum region Vsn (Step S421). Meanwhile, the CPU 7 determines whether or not the position data for indicating a position of the ball is included in a range indicated by the position data for indicating positions of the eight corners of the intra-view-frustum region Vsn every predetermined period of time (1/60 seconds), for instance.

Next, when the CPU 7 determines that the ball is positioned outside the intra-view-frustum region Vsn (No in Step S418) but subsequently determines that the ball is positioned within the intra-view-frustum region Vsn (Yes in Step S421), the CPU 7 determines whether or not the first direction and the second direction match based on the line-of-sight directional vector H1 and the ball-directional vector H2 (Step S422). The line-of-sight directional vector H1 is in a direction from the camera's point-of-sight Pc (as the initial point) to the camera's point-of-target Pf (as the terminal point). On the other hand, the ball directional vector H2 is in a direction from the camera's point-of-sight Pc (as the initial point) to the ball (as the terminal point). For example, the CPU 7 executes processing of computing inner product of the line-of-sight directional vector H1 and the ball-directional vector H2. Then, the CPU 7 determines whether or not the product equals to "1".

When the CPU 7 determines that the product of the line-of-sight directional vector H1 and the ball-directional vector H2 equals to "1" (H1·H2=1, Yes in Step S422), it executes processing of stopping movement of the camera's point-of-target Pf (Step S423). For example, if the CPU 7 determines that the ball is positioned in a direction of the camera's line-of-sight when the ball returned to the inside of the intra-view-frustum region Vsn from the outside thereof, it issues a command of stopping movement of the camera's point-of-target Pf. Accordingly, the CPU 7 stops executing processing of moving the camera's point-of-target Pf about the camera's point-of-sight Pc toward a position of the ball.

On the other hand, when the inner product of the line-of-sight directional vector H1 and the ball-directional vector H2 does not equal to "1" (H1·H2≠1, No in Step S422), movement of the camera's point-of-target Pf is continued until the inner product of the line-of-sight directional vector H1 and the ball-directional vector H2 becomes "1".

In general, mechanical error always occurs when the CPU 7 executes computation. The error similarly occurs in the aforementioned computation of the inner product. In response to this, the CPU 7 determines in the actual computation whether or not the inner product N of the line-of-sight directional vector H1 and the ball-directional vector H2 equals to "1−dg≦N≦1+dg" where an allowable error is set to be "dg (<1)". Therefore, movement of the camera's point-of-target Pf is continued until the inner product N fulfills "1−dg≦N≦1+dg", for instance, in the case of "No in Step S422".

Subsequently, the CPU 7 determines whether or not reception of action-related commands for the batter character 70, the pitcher character 71 and a fielder character 72 is completed (Step S424). For example, the CPU 7 determines whether or not a flag is set for indicating whether or not a play (1 play) ends for the batter character. In this case, when a play (1 play) ends for the batter character, the CPU 7 executes processing of allocating "1" to a value of the flag for indicating that 1 play ends.

Thus, the CPU 7 determines whether or not the value of the flag for indicating whether or not 1 play ends equals to "1" (Step S424). When the CPU 7 determines that the value of the flag for indicating whether or not 1 play ends equals to "1" (Yes in Step S424), it stops receiving action-related commands for the batter character 70, the pitcher character 71 and the fielder character 72 (Step S425). On the other hand, when the CPU 7 determines that the value of the flag for indicating whether or not 1 play ends equals to "0" (No in Step S424), the CPU 7 executes processing of Step S403 and subsequent Steps again.

Next, the CPU 7 determines whether or not the match-up mode ends (Step S426). For example, the CPU 7 determines whether or not a flag is set for indicating whether or not the match-up mode ends. Specifically, the CPU 7 determines whether or not a value of the flag for indicating whether or not the match-up mode ends equals to "1".

Then, when the CPU 7 determines that the value of the flag for indicating whether or not the match-up mode ends equals to "1" (Yes in Step S426), it executes processing of temporarily storing data in the RAM 12 (Step S427). On the other hand, when the CPU 7 determines that the value of the flag for indicating whether or not the match-up mode ends equals to "0" (No in Step S426), it executes processing of Step S402 and subsequent Steps again.

As described above, according to the present embodiment, when the CPU 7 determines that the ball B is positioned outside the intra-view-frustum region Vsn, it executes processing of moving the camera's point-of-target Pf so that the ball B can be positioned within the intra-view-frustum region Vsn. In other words, when the ball B is positioned outside the intra-view-frustum region Vsn, the camera's point-of-target Pf tracks movement of the ball B so that the ball B can be positioned within the intra-view-frustum region Vsn.

With the configuration, the camera's line-of-sight does not necessarily move in conjunction with every single movement of the ball B as long as the ball B is positioned within the intra-view-frustum region Vsn even if the ball B is hit back by the batter character and then flies and bounces in the seats or the outfield, for instance. Accordingly, a game player can watch moving pictures comfortably. Furthermore, the camera's point-of-target Pf is configured to be moved in conjunction with movement of the ball B so that the ball B can be positioned within the intra-view-frustum region Vsn. Therefore, it is possible to automatically set movement of the camera's line-of-sight without making a game provider set movement of the camera's line-of-sight on a match-up to match-up basis as needed.

Moreover, according to the present embodiment, when the CPU 7 determines that the ball B is positioned outside the intra-view-frustum region Vsn, it executes processing of moving the camera's point-of-target Pf so that the ball B can be positioned within the intra-view-frustum region Vsn based on the camera speed data Bc corresponding to the distance data for indicating the distance L between a position of the camera's point-of-sight Pc and a position of the ball B.

With the configuration, the camera's point-of-target Pf can be moved fast if distance is short between the camera's point-of-sight and the ball when the ball B is positioned outside the intra-view-frustum region. On the other hand, the camera's point-of-target can be moved slowly if distance is long between the camera's point-of-sight and the ball when the ball B is positioned outside the intra-view-frustum region. Thus, it is possible to display movement of the ball on the image display unit without making a game player feel that something is wrong by changing the moving speed of the camera's point-of-target.

[Other Example Embodiments]

(a) The aforementioned embodiment exemplified a case that the home video game apparatus is used as an example of a computer that the game program is applicable. However, the game apparatus is not limited to the aforementioned embodiment. For example, the game apparatus is similarly applicable to a game apparatus provided with a separate monitor, a game apparatus with a built-in monitor, and a workstation/personal computer configured to function as a game apparatus in executing a game program. Additionally, the game apparatus can be similarly applied to a portable computer, a portable game apparatus and the like, without being limited to the aforementioned embodiment.

(b) The present invention includes a program for executing the aforementioned game and a computer-readable recording medium in which the program is stored. Not only a cartridge but also a computer-readable flexible disk, a semiconductor memory, a CD-ROM, a DVD, a MO, a ROM cassette and the like are included in the recording medium.

(c) In the aforementioned embodiment, a case is exemplified that only the camera's point-of-target Pf moves. However, the present invention can be applied to a case that only the camera's point-of-sight Pc moves or a case that both of the camera's point-of-target Pf and the camera's point-of-sight Pc move. Similar advantageous effects to the aforementioned embodiment can be obtained in this case, too.

[Industrial Applicability]

In the present invention, when a control unit determines that a moving object is positioned outside an intra-view-frustum region, it executes processing of moving a camera's point-of-sight so that the moving object can be positioned within the intra-view-frustum region. In other words, when the moving object is positioned outside the intra-view-frustum region, the camera's point-of-sight tracks the movement of the moving object so that the moving object can be positioned within the intra-view-frustum region. With the configuration, a game player can comfortably watch moving pictures even if the camera's line-of-sight tracks movement of the moving object. Additionally, it is possible to easily configure the setting of movement of the camera's line-of-sight.

What is claimed is:

1. A non-transitory computer readable medium storing a computer program for a video game in which a camera coordinate system is set for a position of a camera disposed in a three-dimensional game space and in which a moving object moving in the three-dimensional game space is displayed on an image display unit, the computer program comprising:
   code for causing a control unit to recognize point-of-sight position data indicating where a point-of-sight of the camera is;
   code for causing the control unit to recognize point-of-target position data indicating where a point-of-target of the camera is;
   code for causing the control unit to recognize a view-frustum region which extends in a direction from the point-of-sight indicated to the point-of-target;
   code for causing the control unit to recognize an intra-view-frustum region which is within the view-frustum region;
   code for causing the control unit to determine whether or not the moving object is located within the intra-view-frustum region;
   code for causing the control unit to move at least one of the point-of-sight and the point-of-target in order for the moving object to be located within the intra-view-frustum region, if the control unit determines that the moving object is not located in the intra-view-frustum region;
   code for causing the control unit to compute a first-directional vector based on the point-of-sight position data and the point-of-target position data, the first-directional vector being in a first direction from the point-of-sight to the point-of-target;
   code for causing the control unit to compute a second-directional vector based on the point-of-sight position data and the moving-object position data, the second-directional vector being in a second direction from the point-of-sight to the moving object;
   code for causing the control unit to determine whether or not the first direction and the second direction match; and
   code for causing the control unit to stop at least one of the point-of-sight and the point-of-target from moving, if the control unit determines that the first direction and the second direction match.

2. The non-transitory computer recording medium according to claim 1, the computer program further comprising
   code for causing the control unit to recognize moving-object position data indicating where the moving object is;
   code for causing the control unit to compute distance data indicating distance between the point-of-sight and the moving object; and
   code for causing the control unit to recognize camera speed data corresponding to the distance data, the camera speed data indicating at least one of moving speed of the point-of-sight and moving speed of the point-of-target,
   wherein the code for causing the control unit to move at least one of the point-of-sight and the point-of-target includes code for causing the control unit to move at least one of the point-of-sight and the point-of-target in order for the moving object to be located within the intra-view-frustum region, based on the camera speed data.

3. The non-transitory computer readable medium according to claim 2, wherein
   the code for causing the control unit to recognize camera speed data corresponding to the distance data includes code for causing the control unit to reduce at least one of the moving speed of the point-of-sight and the moving speed of the point-of-target in accordance with the distance data.

4. The non-transitory computer readable medium according to claim 3, wherein
   the code for causing the control unit to recognize camera speed data corresponding to the distance data includes code for causing the control unit to recognize such camera acceleration data that at least one of the moving speed of the point-of-sight and the moving speed of the point-of-target is reduced in accordance with the distance data, and for causing the control unit to recognize the camera speed data computed based on the camera acceleration data.

5. The non-transitory computer readable medium according to claim 1, the computer program further comprising
   code for causing the control unit to recognize moving-object position data indicating where the moving object is.

6. The non-transitory computer readable medium according to claim 5, wherein
   the code for causing the control unit to move the point-of-sight in order for the moving object to be located within the intra-view-frustum region, if the control unit determines that the moving object is not located in the intra-view-frustum region, and
   the code for causing the control unit to stop at least one of the point-of-sight and the point-of-target from moving includes code for causing the control unit to stopping at least one of the point-of-sight and the point-of-target, if the control unit determines that the moving object is located within the intra-view-frustum region after the control unit determines that the moving object is located outside the intra-view frustum region and if the control unit determines that the first direction and the second direction match.

7. A game apparatus for a video game in which a camera coordinate system is set for a position of a camera disposed in a three-dimensional game space and in which a moving object moving in the three-dimensional game space is displayed on an image display unit, the game apparatus comprising:
   point-of-sight position recognition means for recognizing point-of-sight position data indicating where a point-of-sight of the camera is;
   point-of-target position recognition means for recognizing point-of-target position data indicating where a point-of-target of the camera is;

view-frustum region recognition means for recognizing a view-frustum region which extends in a direction from the point-of-sight to the point-of-target;
intra-view-frustum region recognition means for causing recognizing an intra-view-frustum region which is within the view-frustum region;
position determination means for determining whether or not the moving object is located within the intra-view-frustum region;
first point-of-sight control means for moving at least one of the point-of-sight and the point-of-target in order for the moving object to be located within the intra-view-frustum region, if that the control unit determines that the moving object is located outside the intra-view-frustum region;
first-directional vector computation means for causing the control unit to compute a first-directional vector based on the point-of-sight position data and the point-of-target position data, the first-directional vector being in a first direction from the point-of-sight to the point-of-target;
second-directional vector computation means for causing the control unit to compute a second-directional vector based on the point-of-sight position data and the moving-object position data, the second-directional vector being in a second direction from the point-of-sight to the moving object;
direction determination means for causing the control unit to determine whether or not the first direction and the second direction match; and
second point-of-sight control means for causing the control unit to stop at least one of the point-of-sight and the point-of-target from moving, if the control unit determines that the first direction and the second direction match.

8. A method for controlling a video game in which a camera coordinate system is set for a position of a camera disposed in a three-dimensional game space and in which a moving object moving in the three-dimensional game space is displayed on an image display unit, the method comprising:
causing a control unit to recognize point-of-sight position data indicating where a point-of-sight of the camera is;
causing the control unit to recognize point-of-target position data indicating where a point-of-target of the camera is;
causing the control unit to recognize a view-frustum region which extends in a direction from the point-of-sight indicated to the point-of-target;
causing the control unit to recognize an intra-view-frustum region which is within the view-frustum region;
causing the control unit to determine whether or not the moving object is located within the intra-view-frustum region;
causing the control unit to move at least one of the point-of-sight and the point-of-target in order for the moving object to be located within the intra-view-frustum region, if the control unit determines that the moving object is not located in the intra-view-frustum region;
causing the control unit to compute a first-directional vector based on the point-of-sight position data and the point-of-target position data, the first-directional vector being in a first direction from the point-of-sight to the point-of-target;
causing the control unit to compute a second-directional vector based on the point-of-sight position data and the moving-object position data, the second-directional vector being in a second direction from the point-of-sight to the moving object;
causing the control unit to determine whether or not the first direction and the second direction match; and
causing the control unit to stop at least one of the point-of-sight and the point-of-target from moving, if the control unit determines that the first direction and the second direction match.

* * * * *